US012560526B1

(12) United States Patent (10) Patent No.: US 12,560,526 B1
Sachdeva et al. (45) Date of Patent: Feb. 24, 2026

(54) SYSTEM OF AND METHOD FOR ASSESSING SURFACE ENERGY IMPACT OF PROBES ON ADHESIVE PROPERTIES

(71) Applicant: Florida A&M University, Tallahassee, FL (US)

(72) Inventors: Mandip Sachdeva, Tallahassee, FL (US); Satyanarayan Dev, Tallahassee, FL (US); Nisarg Modi, Plainview, NY (US); Arvind Bagde, Tallahassee, FL (US); Keb Mosley-Kellum, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 279 days.

(21) Appl. No.: 18/457,862

(22) Filed: Aug. 29, 2023

Related U.S. Application Data

(60) Provisional application No. 63/402,226, filed on Aug. 30, 2022.

(51) Int. Cl.
G01N 19/04 (2006.01)
(52) U.S. Cl.
CPC ..................................... G01N 19/04 (2013.01)
(58) Field of Classification Search
CPC ..................................................... G01N 19/04
USPC ................. 73/150 A, 827, 834; 156/64, 378;
340/500, 665
See application file for complete search history.

(56) References Cited

FOREIGN PATENT DOCUMENTS

| | | | | |
|---|---|---|---|---|
| DE | 19715747 A1 | * | 10/1998 | ............. G01N 19/04 |
| EE | 200300123 A | * | 4/2005 | ............. A61P 29/00 |
| JP | 5474154 B1 | * | 4/2014 | |
| WO | WO-2019152695 A1 | * | 8/2019 | ............. C08L 77/02 |

OTHER PUBLICATIONS

Arkadiusz Kowalski et al. "How does the surface free energy influence the tack of acrylic pressure-sensitive adhesives (PSAs)?" J. Coat. Technol. Res., 10(6) 879-885, 2013.
John C. Charkoudian et al. "A model skin surface for testing adhesion to skin." J. Soc. Cosmet. Chem., 39, 225-234 (Jul./Aug. 1988).

(Continued)

*Primary Examiner* — Robert R Raevis
(74) *Attorney, Agent, or Firm* — Anton J. Hopen; Trenam Law

(57) ABSTRACT

Described herein relates to a system of and method for assessing adhesion properties of an adhesion component of at least one Transdermal Delivery System (hereinafter "TDS") product using a skin-correlated probe. The present disclosure may comprise a skin-correlated probe configured to mimic a surface energy of human skin. Additionally, the skin-correlated probe of the system may be fabricated using additive manufacturing and/or additive layer manufacturing. Accordingly, the skin-correlated probe of the system may substantially decrease the adhesive force required to unbind the adhesive from the skin-correlated probe as compared to an industrial standard stainless steel probe. In addition, the system may be configured to be used for the in vitro in vivo correlation of the at least one TDS product.

19 Claims, 38 Drawing Sheets

(56) References Cited

OTHER PUBLICATIONS

Isabelle Arnet et al. "Poor adhesion of fentanyl transdermal patches may mimic end-of-dosage failure after 48 hours and prompt early patch replacement in hospitalized cancer pain patients" Journal of Pain Research, 2016:9993-999.

Catapres-TTS, "Cross Section of the System" Boehringer Ingelheim. 2016, pp. 1-14.

Francesco Cilurzo et al. "Adhesive properties: a critical issue in transdermal patch development" Expert Opinion. 2012, pp. 33-45.

Jan-Peer Elshoff et al. "Randomized, double-blind, crossover study of the adhesiveness of two formulations of rotigotine transdermal patch in patients with Parkinson's disease" 2018. Current Medical Research and Opinion. vol. 34, No. 7, pp. 1293-1299.

Neupro (Rotigotine Transdermal System) FDA. 2006, pp. 1-31.

Ifrah Jafri et al. "Effect of permeation enhancers on in vitro release and transdermal delivery of lamotrigine from Eudragit® RS100 polymer matrix-type drug in adhesive patches" Progress in Biomaterials. May 2019. pp. 1-10.

Chao Liu et al. "A systemic evaluation of drug in acrylic pressure sensitive adhesive patch in vitro and in vivo: The roles of intermolecular interaction and adhesive mobility variation in drug controlled release" Journal of Controlled Release. 2017. pp. 83-94. 252.

Siji Lv et al. "Effect of backing films on the transdermal delivery of cyclobenzaprine patch" ScienceDirect. Asian journal of pharmaceutical sciences Nov. 2016, pp. 780-783.

Novartis-pharmaceutical (2018) pp. 1-32. https://www.novartis.com/us-en/sites/novartis_us/files/exelonpatch.pdf.

P. Schreier et al. "Surface Modification of Polypropylene Based Particle Foams" AIP Publishing. May 15, 2014. pp. 378-382.

Nirav S Sheth et al. "Formulation and evaluation of transdermal patches and to study permeation enhancement effect of eugenol" Journal of Applied Pharmaceutical Science 01 (03); 2011: 96-101.

Wenting Song et al. "Probing the role of chemical enhancers in facilitating drug release from patches: Mechanistic insights based on FT-IR spectroscopy, molecular modeling and thermal analysis" Journal of Controlled Release 227 (2016) 13-22.

Anna M. Wokovich et al. "Transdermal drug delivery system (TDDS) adhesion as a critical safety, efficacy and quality attribute" European Journal of Pharmaceutics and Biopharmaceutics 64 (2006) 1-8.

Categorizing Surface Energy, 3M Science of Adhesion Educational Series. https://www.3m.com/3M/en_US/bonding-and-assembly-us/resources/science-of-adhesion/categorizing-surface-energy/ Last accessed Jan. 8, 2024.

Bagde, A. et al. Development and adhesion evaluation of transdermal rotigotine patches utilizing 3D-printed skin-mimicking substrate, solid-state NMR, and ATR-FTIR techniques. International Journal of Pharmaceutics 675 (2025) 125522.

* cited by examiner

200

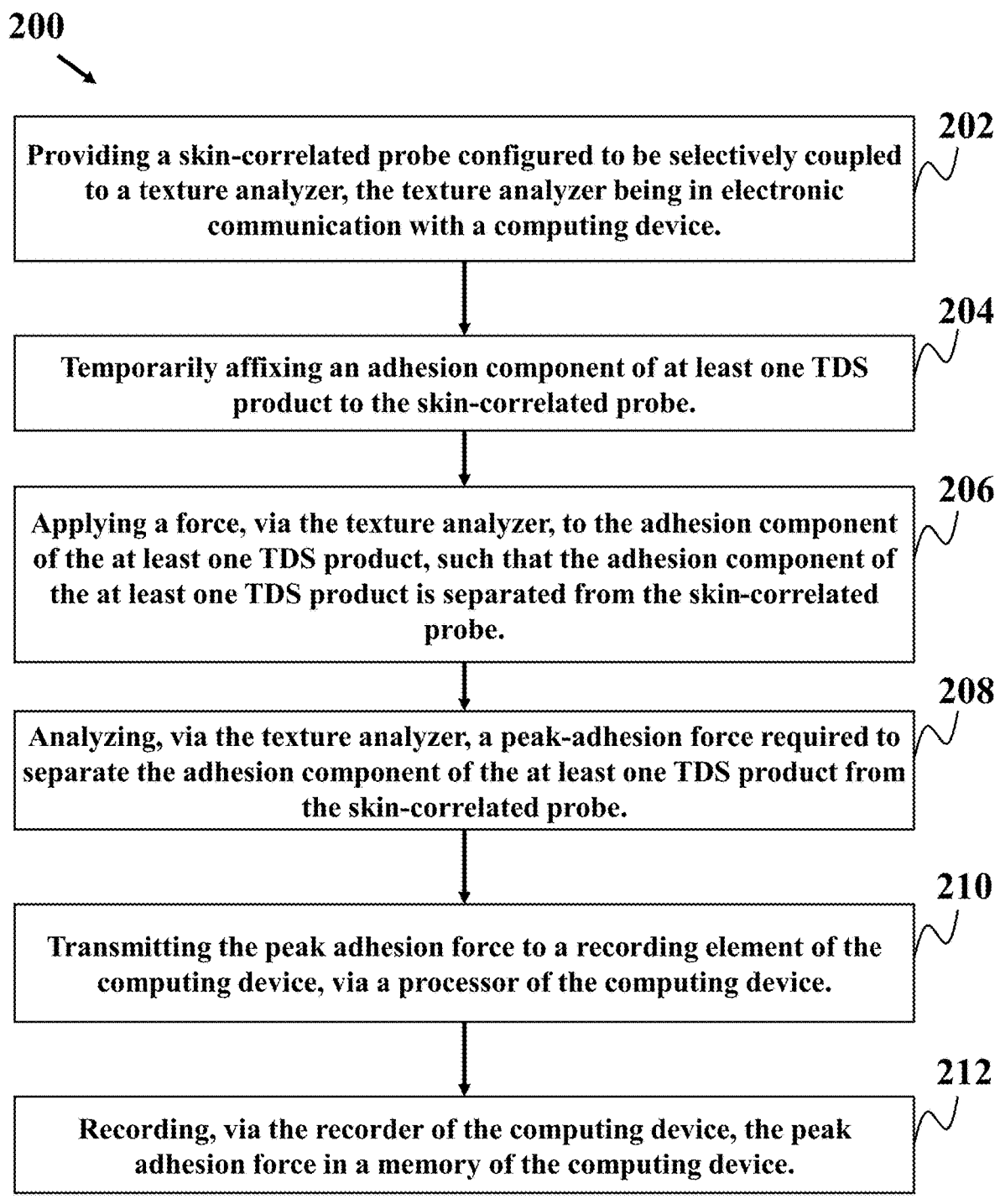

202

Providing a skin-correlated probe configured to be selectively coupled to a texture analyzer, the texture analyzer being in electronic communication with a computing device.

204

Temporarily affixing an adhesion component of at least one TDS product to the skin-correlated probe.

206

Applying a force, via the texture analyzer, to the adhesion component of the at least one TDS product, such that the adhesion component of the at least one TDS product is separated from the skin-correlated probe.

208

Analyzing, via the texture analyzer, a peak-adhesion force required to separate the adhesion component of the at least one TDS product from the skin-correlated probe.

210

Transmitting the peak adhesion force to a recording element of the computing device, via a processor of the computing device.

212

Recording, via the recorder of the computing device, the peak adhesion force in a memory of the computing device.

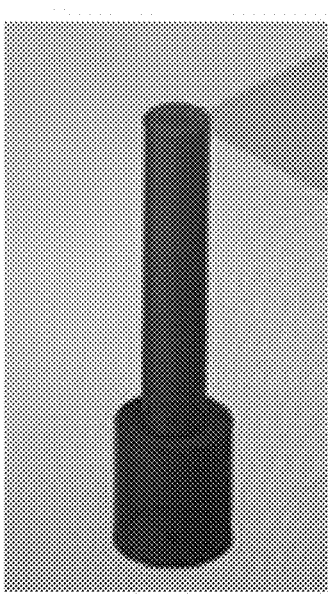
*FIG. 15A*

(b)

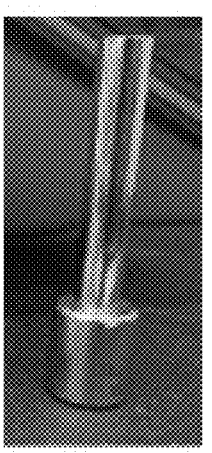
*FIG. 15C*

(b)
Non-amine compatible PSA-4501

SYSTEM OF AND METHOD FOR ASSESSING SURFACE ENERGY IMPACT OF PROBES ON ADHESIVE PROPERTIES

CROSS-REFERENCE TO RELATED APPLICATIONS

This nonprovisional application claims the benefit of U.S. Provisional Application No. 63/402,226 entitled "SYSTEM OF AND METHOD FOR ASSESSING SURFACE ENERGY IMPACT OF PROBES ON ADHESIVE PROPERTIES" filed Aug. 30, 2022 by the same inventors, all of which is incorporated herein by reference, in its entirety, for all purposes.

BACKGROUND OF THE INVENTION

1. Field of the Invention

This invention relates, generally, to adhesion properties of Transdermal Delivery System (hereinafter "TDS") products. More specifically, it relates to a system of and method for assessing adhesion properties of an adhesion component of at least one TDS product using a skin-correlated probe.

2. Brief Description of the Prior Art

The controversial impact of adhesion issues with Transdermal Delivery System (hereinafter "TDS") products have been widely debated among both pharmaceutical and regulatory scientists. As such, despite the fact that these issues were first identified over a decade ago, it is only recently that industry and regulatory agencies have gained meaningful insights into TDS adhesion issues and have begun to develop novel tools to address these issues.

Currently known adhesion techniques generally rely on the use of stainless steel probes (e.g., TA-57R) to test adhesion properties of TDS products. However, the use of stainless steel probes in assessing surface energy impact comes with substantial drawbacks, as stainless steel probes generally comprise a surface energy of 500 dyne/cm, substantially higher than the surface energy of the human skin of roughly 25-50 dyne/cm. Accordingly, TDS products (e.g., transdermal patches) are often prescribed to be applied once in 3-7 days, however, they do not retain a proper adhesive and fall off the skin of the patient and/or user before the prescribed time has passed. For example, as per the manufacturer's guideline, Fentanyl transdermal patch reapplication should be done every after 3 days, however, it has been seen that individual user reapplication of the TDS product is inconsistent, leading to significant side effects due to the effects of the drug and failure of prescribed dose delivered. Additionally, clonidine patches, which are sold in the market for the treatment of hypertension and to prevent strokes, heart attack, and kidney abnormalities are usually applied for 1 week as per the manufacturer's guidelines. However, manufacturer of these clonidine patches requires that if patch starts loosening from the skin or falls off completely, patients must reapply the patch before a week. However, there is no strict guideline for the definition of loosening, which leads to early and late reapplication, creating increasing difficulty for delivering the appropriate prescribed dose to the user.

Additionally, although TDS are evaluated in in vitro adhesion studies, they don't retain their adhesive strength and fall off earlier than their prescribed time and may require additional overlay to put on the TDS to overcome the adhesive issues (Cilurzo, Gennari et al. 2012, Boehringer-Ingelheim 2016). Many marketed TDSs have already been facing an issue of patch adhesion failure including clonidine (1 week patch), fentanyl (72 h patch), rivastigmine (24 h patch) and rotigotine (24 h patch) which fall off before their prescribed time duration (FDA 2006, Wokovich, Prodduturi et al. 2006, Cilurzo, Gennari et al. 2012, Arnet, Schacher et al. 2016, Boehringer-Ingelheim 2016, Elshoff, Bauer et al. 2018, Novartis-pharmaceutical 2018). As per the manufacturer's guideline. Fentanyl transdermal patch reapplication should be done every after 3 days (72 hours).

However, in a study conducted at St Clara hospital, cancer center, Switzerland, it was observed that, nearly all the patients (in a total of 739 patients), the fentanyl patches were replaced every after 2 days which resulted in side effects of the drug and failure of prescribed dose delivered. The early reapplication of the patches is mainly due to losing of the adhesion between skin and the transdermal patch (Arnet, Schacher et al. 2016). Clonidine patches which are sold in the market for the treatment of hypertension and to prevent strokes, heart attack and kidney abnormalities is usually applied for 1 week as per the Manufacturer's guideline. However, manufacturer also indicates that if patch may start loosening from the skin or falls off completely, patients must reapply the patch before a week (Boehringer-Ingelheim 2016).

Even though, the transdermal patches available in the market are characterized for their adhesion properties in vitro including probe tack test where stainless steel probe (surface energy >700 dyne/cm) is used, they fail to correlate with skin adhesion testing since the skin has a surface energy in the range of 25-50 dyne/cm (depending on its moisture content) (3M 2023). There are reports demonstrating the effect of molecular interaction between a) acrylic pressure sensitive adhesives (hereinafter "PSAs") and API on drug permeation (Liu, Quan et al. 2017), b) excipients including permeation enhancers and PSA on drug release (Sheth and Mistry 2011, Song, Quan et al. 2016, Jafri, Shoaib et al. 2019) and c) backing film and PSAs on flux of the drug (Lv, Quan et al. 2016). Moreover, a study in 1988 demonstrated the development of model skin surface using gelatin for testing adhesive patches. However, it wasn't tested on marketed transdermal patches (Charkoudian 1988). Further, it wasn't translated to industry because of the complexity in development of model skin surface.

Additionally, model skin surface has not been tested in stability studies which is important for the reproducibility in adhesion results. Kowalski et al. reported a study of tack properties measurement of acrylic PSAs crosslinked using polyethylene, polypropylene, polytetrafluorethylene, stainless steel, glass, polycarbonate and poly (methyl methacrylate) (Kowalski, Czech et al. 2013). Although, they demonstrated the relation of tack and the surface free energy, the various types of FDA approved pressure sensitive adhesives including silicone, acrylate and polyisobutylene used in marketed transdermal patches were not studies. Moreover, they modified adhesives by crosslinking using different materials such as glass and then studied tack properties of these modified adhesives. Therefore, there is an urgent need to determine the effect of various factors affecting the adhesion properties of TDS products to overcome the patch adhesion failure issue and avoid extensive in vivo studies.

Accordingly, what is needed is an accurate, efficient, easy-to-use, skin-correlated probe for testing adhesion properties. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a system of and method for assessing adhesion properties using a skin-correlated probe.

An aspect of the present disclosure pertains to a method for automatically assessing adhesion properties of an adhesion component of at least one transdermal delivery system (hereinafter "TDS") product using a surface energy impact assessment system. In an embodiment, the method may comprise the following: (a) temporarily affixing a skin-correlated probe to a texture analyzer of the surface energy impact assessment system, the surface energy impact assessment system being communicatively coupled to a computing device having at least one processor, such that at least one portion of the skin-correlated probe may be configured to abut at least one portion of a surface of the adhesion component of the at least one TDS product; (b) applying, via the texture analyzer, a force to the adhesion component of the at least one TDS product, such that the force may be configured to separate the at least one portion of the skin-correlated probe from the at least one portion of the adhesion component of the at least one TDS product; (c) calculating, via the at least one processor of the computing device, a peak-adhesion force of the at least one TDS product, such that the peak-adhesion force may comprise a total force required to separate the adhesion component from the skin-correlated probe; (d) comparing, via the at least one processor of the computing device, the analyzed peak-adhesion force to a predetermined peak-adhesion force; and (e) automatically, displaying, in real-time, the analyzed peak adhesion force on a display device associated with the computing device, such that when the analyzed peak-adhesion force is lower than the predetermined peak adhesive force, the display device may be configured to transmit a notification indicative of optimized prediction of in vitro in vivo correlation.

In some embodiments, the predetermined peak-adhesion force may comprise a peak-adhesion force of a stainless steel probe. In addition, in these other embodiments, the method may further comprise the step of, recording, via the at least one processor of the computing device, the analyzed peak adhesion force in a memory of the computing device.

In some embodiments, the method may further comprise the step of, comparing, via the at least one processor of the computing device, the recorded peak adhesion force to an alternative analyzed peak adhesion force and/or the predetermined peak adhesion force. In these other embodiments, the method may also comprise the step of, automatically displaying, via the at least one processor of the computing device, the analyzed peak adhesion force on the display device associated with the computing device, by: (i) based on a determination that the recorded peak adhesion force is lower than the alternative analyzed peak adhesion force and/or the predetermined peak adhesion force, transmitting a notification indicative of recommending use of the skin-correlated probe associated with the recorded peak adhesion force; and (ii) based on a determination that the recorded peak adhesion force is higher than the alternative analyzed peak adhesion force and/or the predetermined peak adhesion force, transmitting a notification indicative of not recommending use of the skin-correlated probe associated with the recorded peak adhesion force.

In some embodiments, the surface energy impact assessment system may further comprise an additive manufacturing device. In this manner, the method may further comprise the step of, generating, via the additive manufacturing device, the skin-correlated probe, such that the generated skin-correlated probe may comprise a surface energy having a range of at least 10 dyne/cm.

In some embodiments, the step of temporarily affixing the skin-correlated probe to the texture analyzer may further comprise the step of, heating the adhesion component for a predetermined period of time, such that the adhesion component may be affixed to a release liner. In these other embodiments, the adhesion component may be heated to at least 90° C. In addition, the predetermined period of time is at least 30 minutes. Furthermore, the surface energy impact assessment system may comprise a laminator, such that the step of temporarily affixing the skin-correlated probe to the texture analyzer may further comprise the step of, laminating the release liner to a backing membrane.

Moreover, another aspect of the present disclosure pertains to a system for automatically assessing adhesion properties of an adhesion component of at least one transdermal delivery system (hereinafter "TDS") product. In an embodiment, the system may comprise the following: (a) a skin-correlated probe, such that the skin-correlated probe may comprise a surface energy having a range of at least 10 dyne/cm; (b) a texture analyzer, the texture analyzer being configured to selectively couple to the skin-correlated probe; and (c) a computing device comprising at least one processor, the computing device being communicatively coupled to the texture analyzer. In this embodiment, when selectively coupled to the texture analyzer, at least one portion of the skin-correlated probe may be configured to abut at least one portion of the adhesion component of the at least one TDS product. In this manner, the texture analyzer may be configured to import a force onto the skin-correlated probe and/or the adhesion component, such that the at least one portion of the skin-correlated probe may be separated from the at least one portion of the adhesion component of the at least one TDS product. As such, the computing device may be configured to record and/or display the total force required to separate the at least one portion of the skin-correlated probe from the at least one portion of the adhesion component, such that a peach adhesion force may be calculated.

In some embodiments, the system may further comprise an additive manufacturing device, such that the additive manufacturing device may be configured to generate the skin-correlated probe. As such, at least one portion of the skin-correlated probe may comprise polyethylene and/or polypropylene.

In some embodiments, the adhesion component may also comprise a silicone amine compatible coating and/or a silicone non-amine compatible coating. In some embodiments, the texture analyzer may further comprise a skin-correlated probe sander. In these other embodiments, the texture analyzer may be configured to postprocess the skin-correlated probe, via the skin-correlated probe sander, such that the skin-correlated probe may be altered such that the at last one portion of the skin-correlated probe configured to contact the adhesion comprises an identical surface with no deformations. In addition, in these other embodiments, the skin-correlated probe may comprise a peak adhesion force of at least 2 g.

In addition, in some embodiments, the skin-correlated probe may comprise any material known in the art which may comprise a surface energy having a range of at least 10 dyne/cm to at most 80 dyne/cm, encompassing every integer in between. For example, in this embodiment, the skin-correlated probe may comprise a material having a range of at least 25 dyne/cm to at most 50 dyne/cm. Additionally, in this embodiment, the skin-correlated probe may comprise the following materials, including but not limited to polyethylene, polypropylene, poly(vinylidene fluoride), silicone, polyvinyl fluoride, poly (dimethyl-siloxane), fluorinated ethylene propylene, natural rubber, polychlorotrifluoroethylene, and/or polybutylene terephthalate.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2 is a processor flow diagram depicting a method of automatically assessing an adhesion property of an adhesion component of at least one TDS product using a skin-correlated probe, via a texture analyzer of a surface energy impact assessment system, according to an embodiment of the present disclosure.

FIGS. 4A-4B are graphs illustrating a peak adhesive force required to unbind a polyethylene probe, a polypropylene probe, and/or a steel probe after contact with an adhesive, according to an embodiment of the present disclosure. FIG. 4A is a graph illustrating a peak adhesive force required to unbind a polyethylene probe, a polypropylene probe, and/or a TA-57R stainless steel probe after contact with a silicone amine compatible 4501_5 mg coating adhesive. FIG. 4B is a graph illustrating a peak adhesive force required to unbind a polyethylene probe, a polypropylene probe, and/or a TA-57R stainless steel probe after contact with a silicone amine compatible 4501_10 mg coating adhesive.

FIG. 5A is a graph illustrating a peak adhesive force required to unbind a polyethylene probe, a polypropylene probe, and/or a TA-57R stainless steel probe after contact with a silicone amine compatible 4302_5 mg coating adhesive. FIG. 5B is a graph illustrating a peak adhesive force required to unbind a polyethylene probe, a polypropylene probe, and/or a TA-57R stainless steel probe after contact with a silicone amine compatible 4302_10 mg coating adhesive.

Figure 6A:
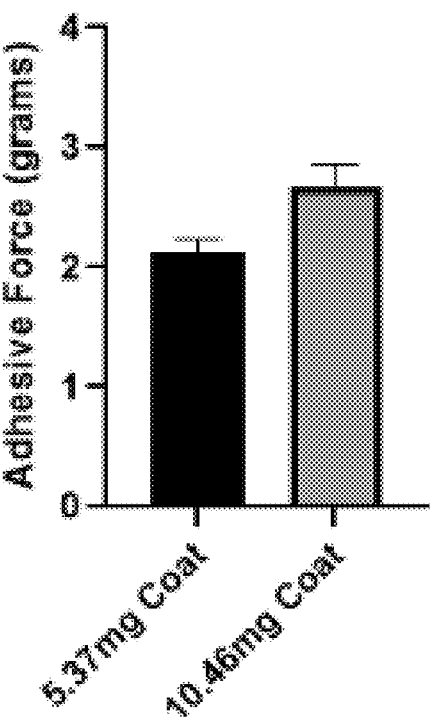
Figure 6B:
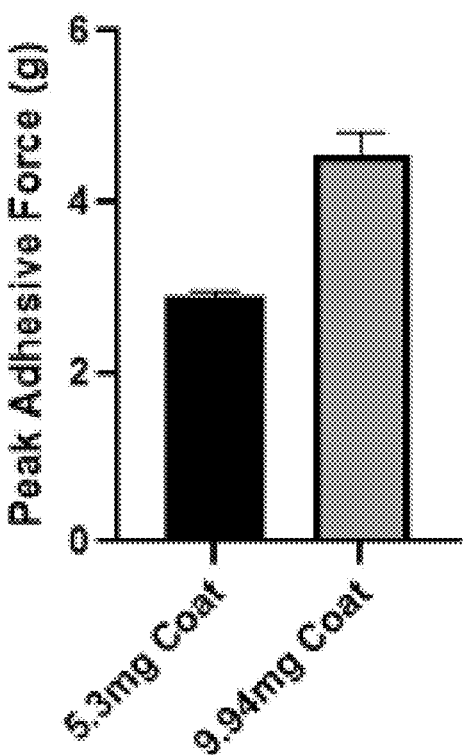

FIGS. 6A-6B are graphs illustrating a peak adhesive required to unbind a polyethylene probe and/or a polypropylene probe after contact with a silicone amine compatible adhesive, according to an embodiment of the present disclosure. FIG. 6A is a graph illustrating a peak adhesive required to unbind a polyethylene probe after contact with a silicone amine compatible 4501 adhesive on a 5 mg and/or a 10 mg coating. FIG. 6B is a graph illustrating a peak adhesive required to unbind a polypropylene probe after contact with a silicone amine compatible 4501 adhesive on a 5 mg and/or a 10 mg coating.

Figure 7A:
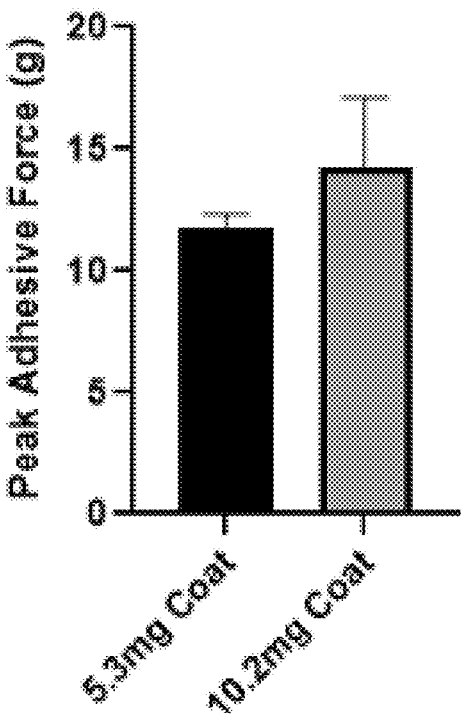
Figure 7B:
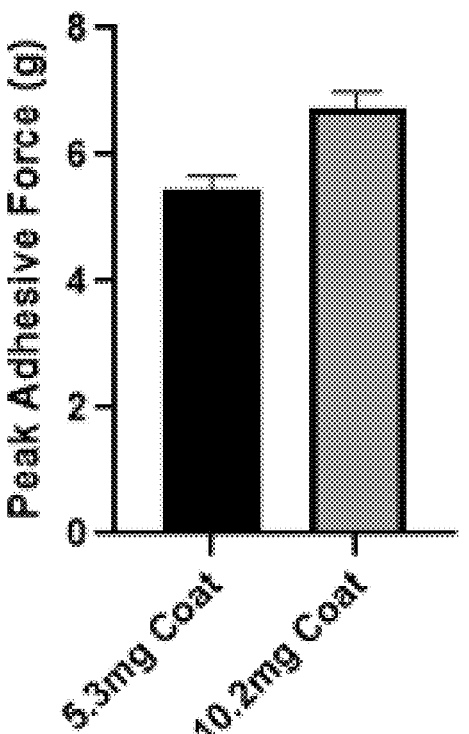

FIGS. 7A-7B are graphs illustrating a peak adhesive required to unbind a polyethylene probe and a polypropylene probe after contact with a silicone non-amine compatible adhesive, according to an embodiment of the present disclosure. FIG. 7A is a graph illustrating a peak adhesive required to unbind a polyethylene probe after contact with a silicone non-amine compatible 4501 adhesive on a 5 mg and/or a 10 mg coating. FIG. 7B is a graph illustrating a peak adhesive required to unbind a polypropylene probe after contact with a silicone non-amine compatible 4501 adhesive on a 5 mg and/or a 10 mg coating.

Figure 8A:
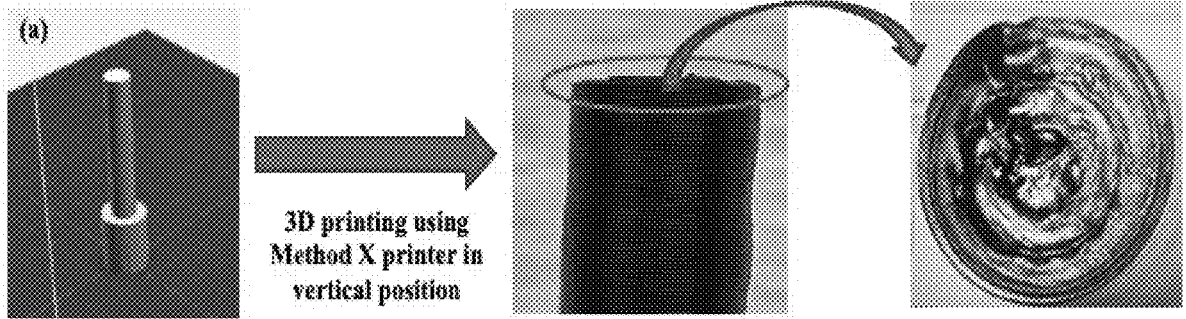
Figure 8B:
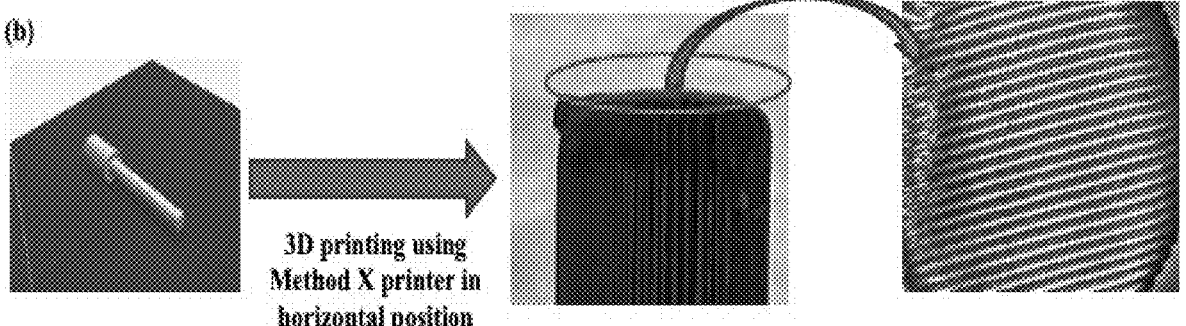

FIGS. 8A-8B is a set of images depicting a three-dimensional (hereinafter "3D") model of a probe, according to an embodiment of the present disclosure. FIG. 8A is a 3D model of probe placed in vertical orientation resulted in probe with uneven and rough surface. FIG. 8B is a CAD design of probe placed in horizontal orientation resulted in probe with smoother and concave surface.

Figure 9:
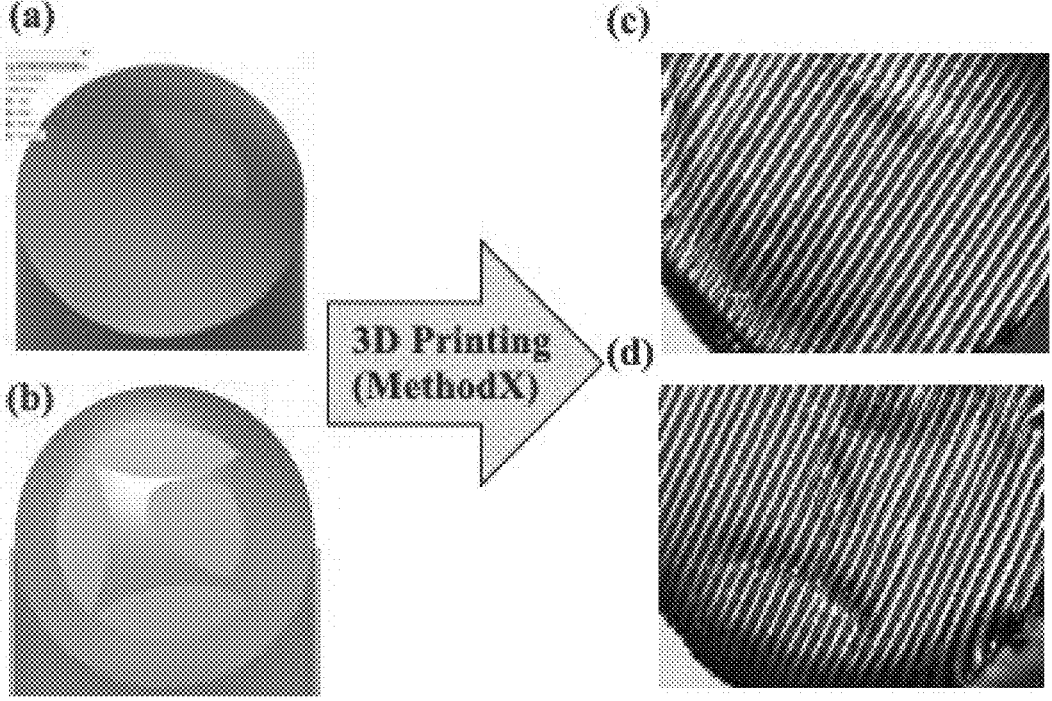

FIG. 9 is a diagram depicting both a three-dimensional (hereinafter "3D") model with (a) 1 and (b) 4 micro delamination on probe surface and 3D printed probe image showing (c) 1 and (d) 4 micro delamination, according to an embodiment of the present disclosure.

Figure 10:
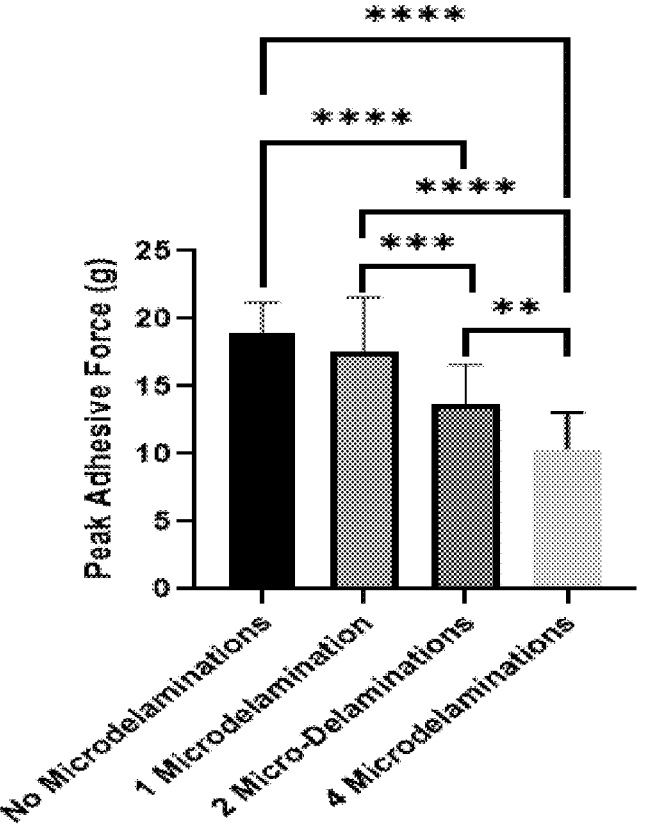

FIG. 10 is a graph depicting a probe tack test showing decrease in peak adhesive force with increase in micro delamination on probe surface, according to an embodiment of the present disclosure.

Figure 11A:
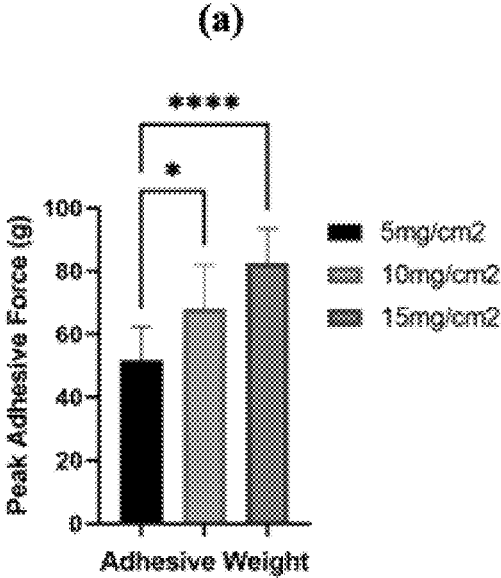
Figure 11B:
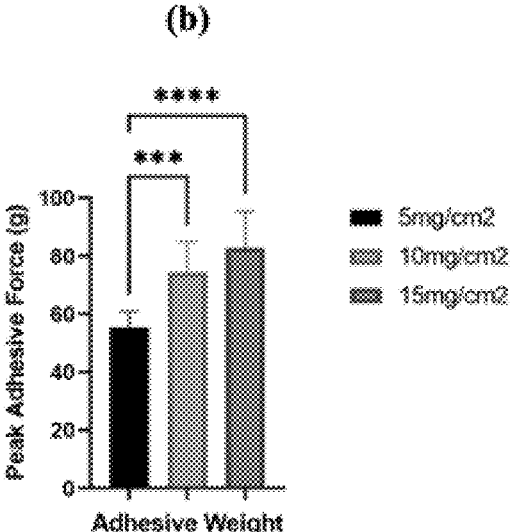
Figure 11C:
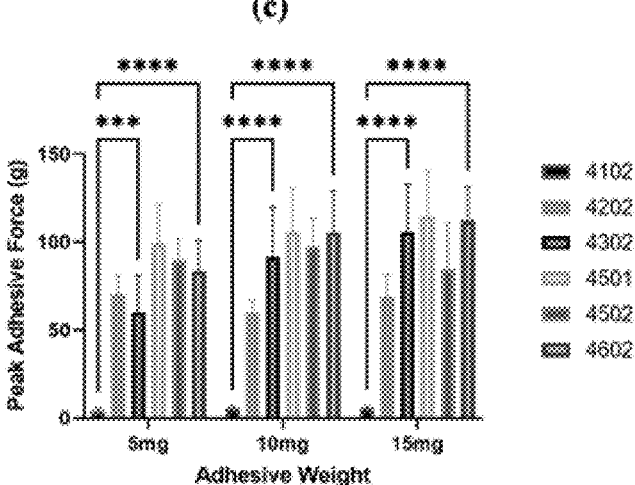

FIGS. 11A-11C is a set of graphs depicting a peak adhesive force for amine compatible and non-amine compatible PSAs when coated on glass, according to an embodiment of the present disclosure. FIG. 11A is a graph depicting an amine compatible PSA 4302 showing increase in peak adhesive force at 10 and 15 mg/cm$^2$ coating as compared to 5 mg/cm$^2$ when coated on glass. FIG. 11B is a graph depicting a non-amine compatible PSA 4501 showing increase in peak adhesive force at 10 and 15 mg/cm$^2$ coating as compared to 5 mg/cm$^2$ when coated on glass. FIG. 11C is a graph depicting an amine compatible PSA 4102 showing significantly low peak adhesive force at 5, 10 and 15 mg/cm$^2$ coating as compared to all other PSAs when coated on glass.

Figure 12A:
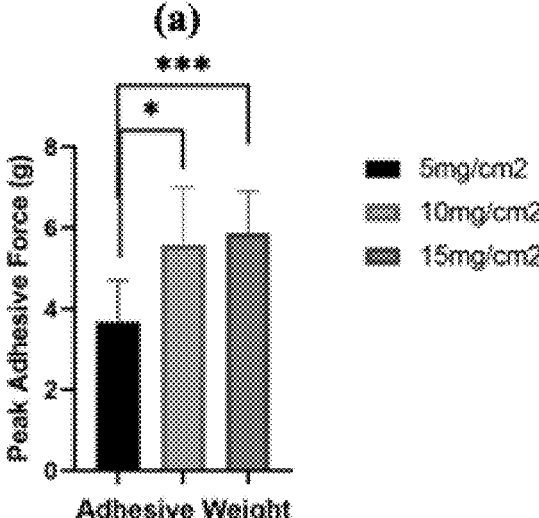
Figure 12B:
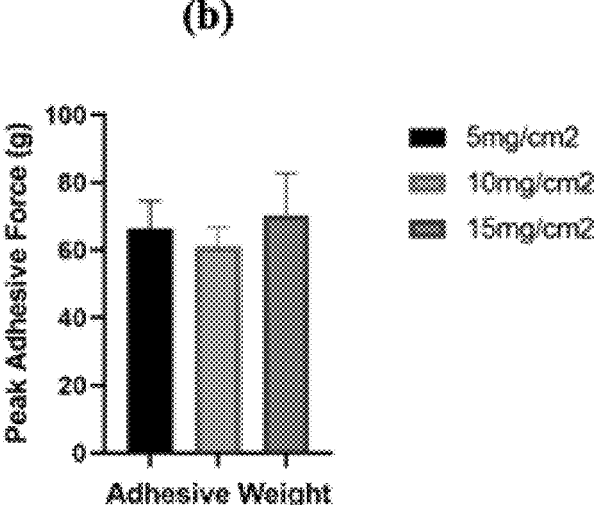
Figure 12C:
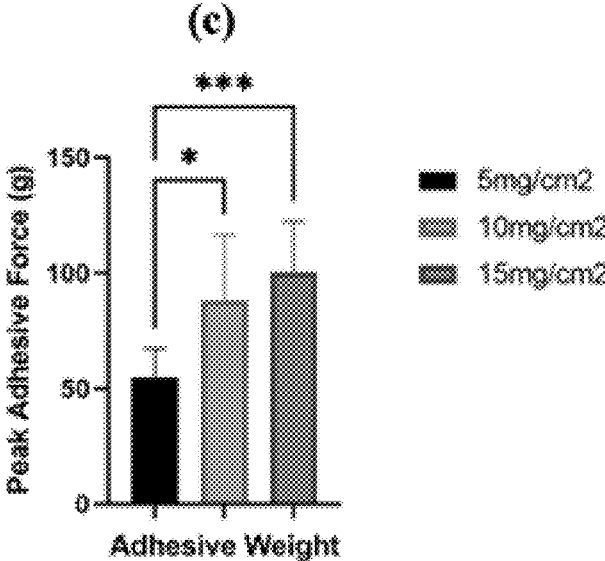
Figure 12D:
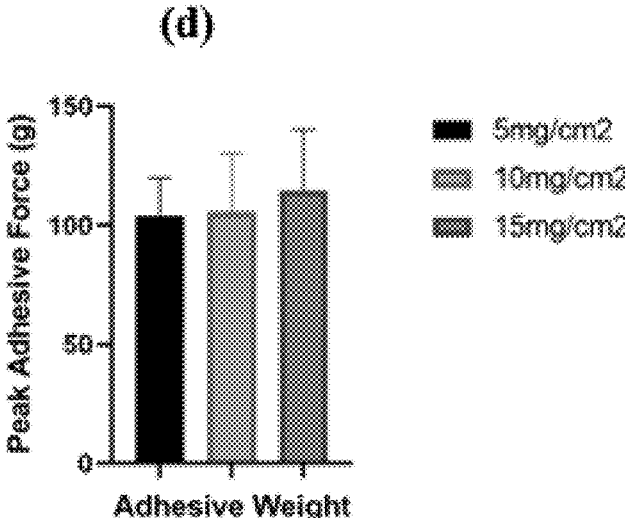
Figure 12E:
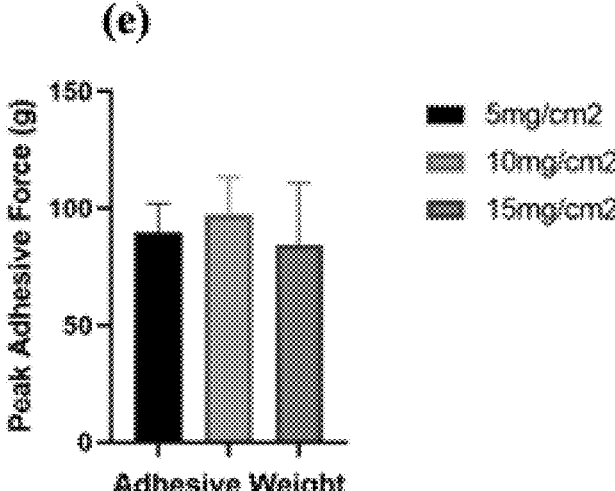
Figure 12F:
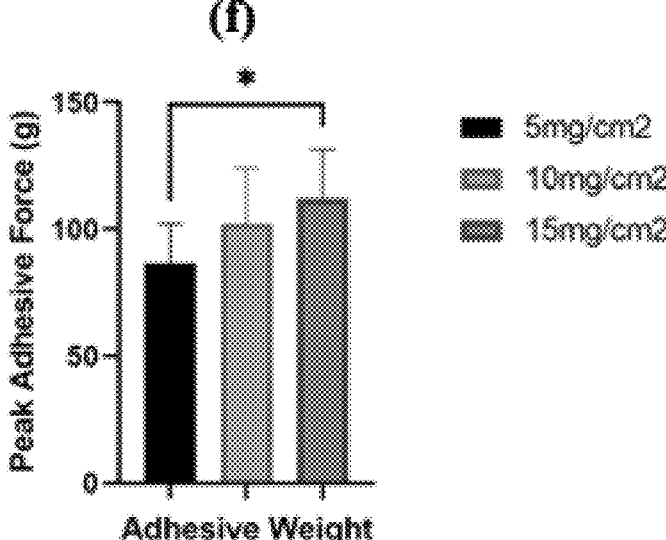

FIGS. 12A-12F is a set of graphs depicting a peak adhesive force for amine compatible and non-amine compatible PSAs when coated on a 100% elongated backing membrane 9735, according to an embodiment of the present disclosure. FIG. 12A is a graph depicting an amine compatible PSA 4102 showing significant increase in peak adhesive force at 10 and 15 mg/cm$^2$ as compared to 5 mg/cm$^2$ coating when coated on 100% elongated backing membrane 9735. FIG. 12B is a graph depicting an amine compatible PSA 4202 showing no effect in peak adhesive force at 5, 10 and 15 mg/cm$^2$ coating when coated on 100% elongated backing membrane 9735. FIG. 12C is a graph depicting an amine compatible PSA 4302 showing significant increase in peak adhesive force at 10 and 15 mg/cm$^2$ as compared to 5 mg/cm$^2$ coating when coated on 100% elongated backing membrane 9735. FIG. 12D is a graph depicting a non-amine compatible PSA 4501 showing no effect in peak adhesive force at 5, 10 and 15 mg/cm$^2$ coating when coated on 100% elongated backing membrane 9735. FIG. 12E is a graph depicting a non-amine compatible PSA 4502 showing no effect in peak adhesive force at 5, 10 and 15 mg/cm$^2$ coating when coated on 100% elongated backing membrane 9735. FIG. 12F is a graph depicting a non-amine compatible PSA 4602 showing no effect in peak adhesive force at 5 and 10 mg/cm$^2$ as compared to 15 mg/cm$^2$ coating when coated on 100% elongated backing membrane 9735.

Figure 13A:
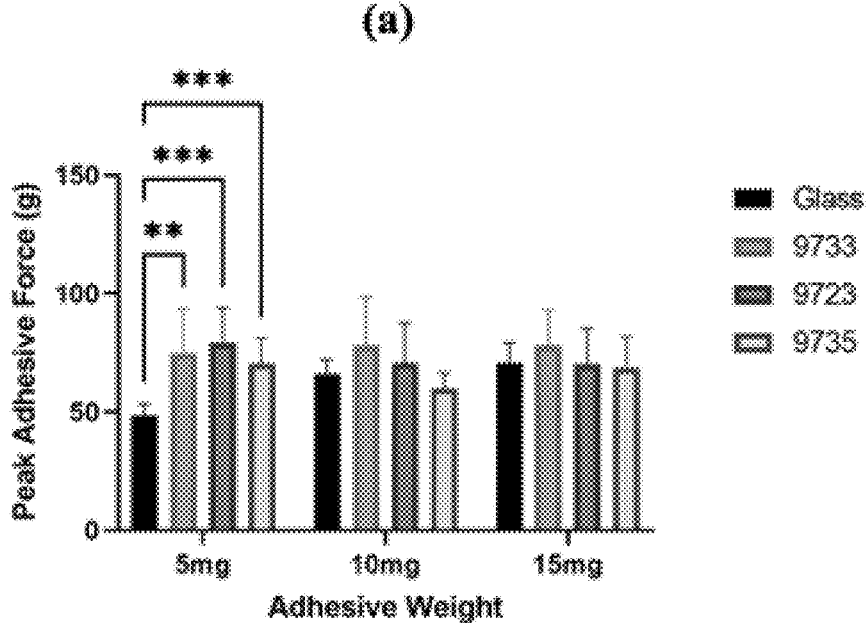
Figure 13B:
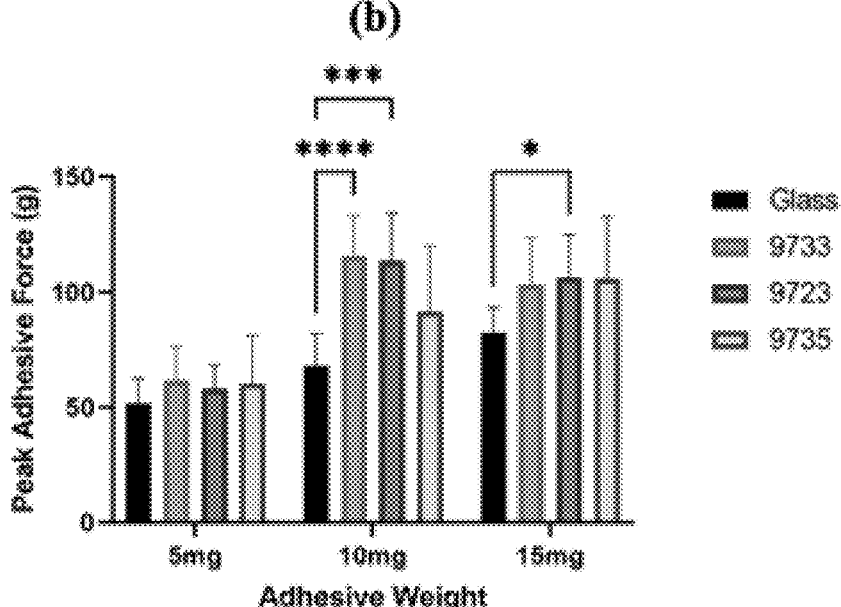
Figure 13C:
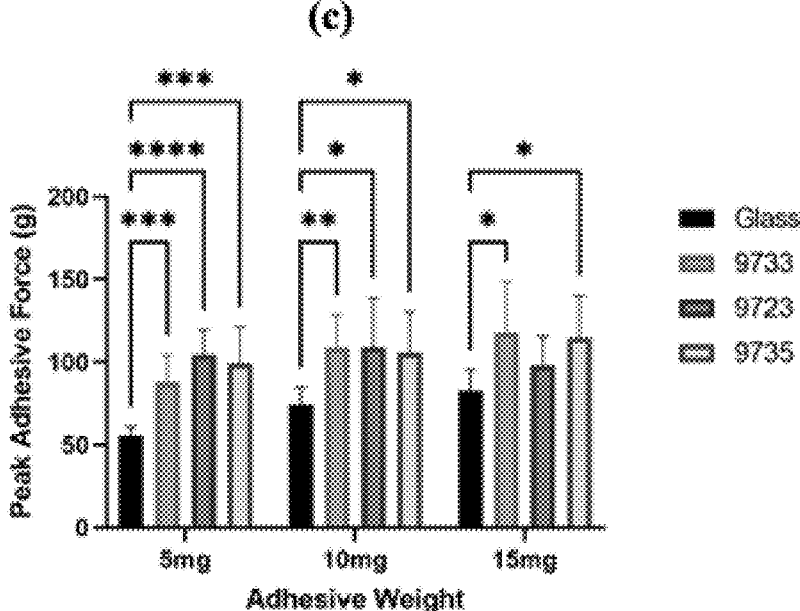

FIGS. 13A-13C is a set of graphs depicting a peak adhesive force for amine compatible and non-amine compatible PSAs when coated on backing membranes 9733, 9723 and 9735, according to an embodiment of the present disclosure. FIG. 13A is a graph depicting an amine compatible PSA 4202 showing no significant difference in tack properties at 5, 10 and 15 mg/cm$^2$ coating on backing membranes 9733, 9723 and 9735. FIG. 13B is a graph depicting an Amine compatible PSA 4302 showing no significant difference in tack properties at 5, 10 and 15 mg/cm$^2$ coating on backing membranes 9733, 9723 and 9735. FIG. 13C is a graph depicting a non-mine compatible PSA 4501 showing no significant difference in tack properties at 5, 10 and 15 mg/cm$^2$ coating on backing membranes 9733, 9723 and 9735.

Figure 14A:
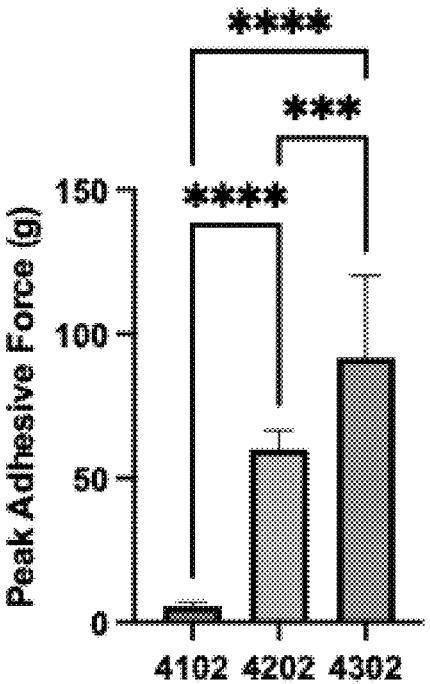
Figure 14B:
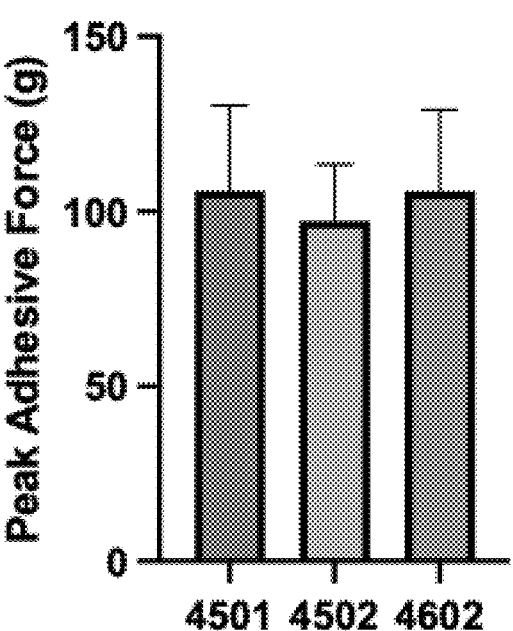

FIGS. 14A-14B is a set of graphs depicting a peak adhesive force for amine compatible and non-amine compatible PSA's as compared to all other amine compatible and non-amine compatible PSAs, according to an embodiment of the present disclosure. FIG. 14A is a graph depicting an amine compatible PSAs showing significantly low peak adhesive force for PSA-4102 as compared to all other amine PSAs including 4202 and 4302. FIG. 14B is a graph depicting a non-amine compatible PSAs showing no significant effect on peak adhesive force in PSA-4501, 4502 and 4602.

Figure 15B:
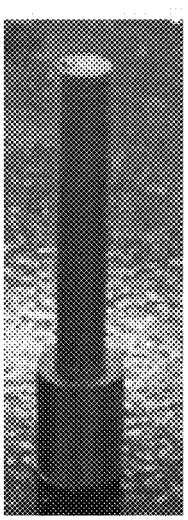
Figure 15D:
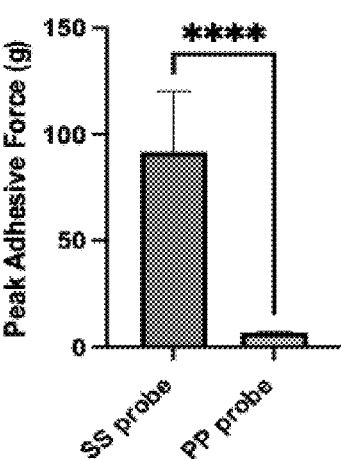
Figure 15E:
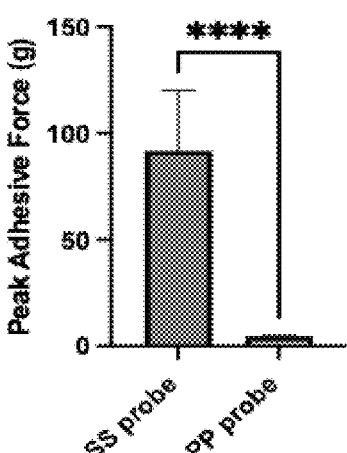

FIGS. 15A-15E is a set of images and graphs depicting a three-dimensional (hereinafter "3D") probe and respective probe track testing of the TDS product using the 3D probe, according to an embodiment of the present disclosure. FIG. 15A is an image depicting a 3D probe design in Autodesk fusion 360 software. FIG. 15B is an image depicting a polypropylene 3D printed probe. FIG. 15C is an image depicting an Industrial standard stainless-steel probe used in probe tack testing of the TDS products. FIG. 15D is a graph depicting a peak adhesive force required to unbind polypropylene probe as compared to industrial standard TA-57R SS probe after contact with silicone amine compatible PSA 4302. FIG. 15E is a graph depicting a peak adhesive force required to unbind polypropylene probe as compared to industrial standard TA-57R SS probe after contact with non-amine compatible PSA 4501.

Figure 16A:
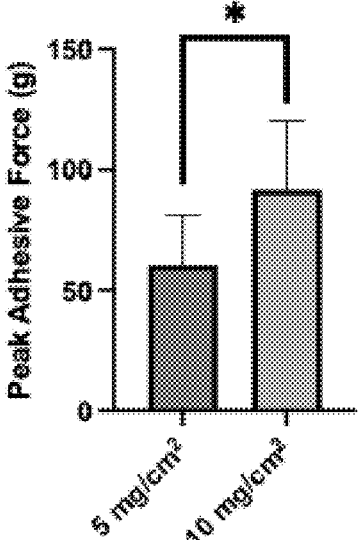
Figure 16B:
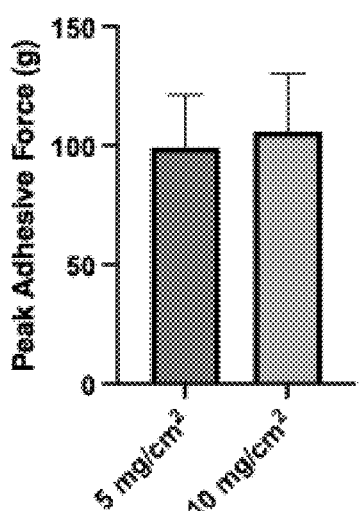
Figure 16C:
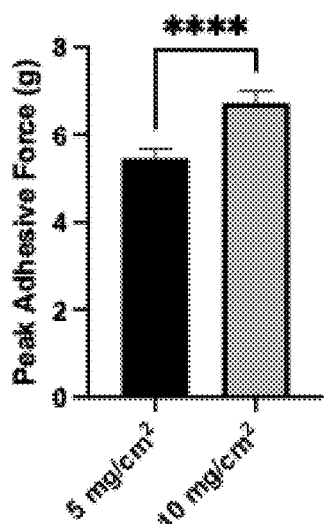
Figure 16D:
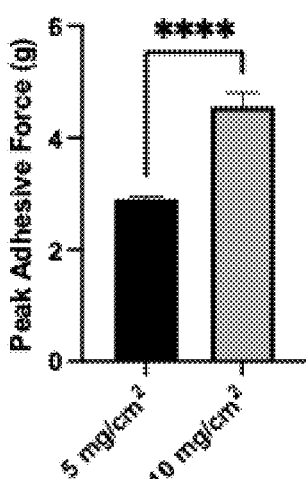

FIGS. 16A-16D is a set of graphs depicting a peak adhesive force for amine compatible and non-amine compatible PSA's comprising variable adhesive coatings, according to an embodiment of the present disclosure. FIG. 16A is a graph depicting a task test results of SS probe of amine compatible PSA-4302 showing increase in peak adhesive force at 10 mg/cm$^2$ coating as compared to a 5 mg/cm$^2$ coating. FIG. 16B is a graph depicting a task test results of SS probe of non-amine compatible PSA-4501 showing no significant difference in peak adhesive force at 5 and 10 mg/cm$^2$ coating. FIG. 16C is a graph depicting a task test results of PP probe of amine compatible PSA-4302 showing increase in peak adhesive force at 10 mg/cm$^2$ coating as compared to 5 mg/cm$^2$ coating. FIG. 16D is a graph depicting a Task test results of PP probe of amine compatible PSA-4501 showing increase in peak adhesive force at 10 mg/cm$^2$ coating as compared to 5 mg/cm$^2$ coating.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment." or "embodiments" means that a particular feature, structure, characteristic, or function described in connection with the embodiment is included in at least one embodiment of the disclosure and may be in more than one embodiment. The appearances of the phrases "in one embodiment," "in an embodiment." "in embodiments," "in alternative embodiments," "in an alternative embodiment," or "in some embodiments" in various places in the specification are not necessarily all referring to the same embodiment or embodiments. The terms "include," "including." "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wireline, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, Swift, MATLAB, and/or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term "TDS product" refers to any device known in the art which may be configured to transmit a substance, via topical application. The TDS product may be a transdermal patch, a clonidine path, a contraceptive patch, a nicotine patch, a caffeine patch, and/or a vitamin patch. For ease or reference, the exemplary embodiment described herein refers to a transdermal patch, but this description should not be interpreted as exclusionary of other TDS products.

As used herein, the term "computing device" refers to any functional electrical component known in the art which can perform substantial computations, including numerous arithmetic operations and/or logic operations without human intervention. Non-limiting examples of the computing device may include a laptop, a mobile device, a computer, and/or a tablet. For ease of reference, the exemplary embodiment described herein refers to a mobile device and/or a computer, but this description should not be interpreted as exclusionary of other functional electrical components.

As used herein, the term "communicatively coupled" refers to any coupling mechanism configured to exchange information (e.g., at least one electrical signal) using methods and devices known in the art. Non-limiting examples of communicatively coupling may include Wi-Fi, Bluetooth, wired connections, wireless connection, quantum, and/or magnets. For ease of reference, the exemplary embodiment described herein refers to Wi-Fi and/or Bluetooth, but this description should not be interpreted as exclusionary of other electrical coupling mechanisms.

As used herein, the term "peak-adhesion force" refers to the force known in the art which may be used to separate an adhesion component for at least one TDS product from a skin-correlated probe. For ease of reference, the exemplary embodiment, described herein refers to the force applied by the texture analyzer, but this description should not be interpreted as limiting to other forces.

As used herein, the terms "about," "approximately," or "roughly" as used herein refer to being within an acceptable error range for the particular value as determined by one of ordinary skill in the art, which will depend in part on how the value is measured or determined, i.e., the limitations of the measurement system, i.e., the degree of precision required for a particular purpose, such real-time pricing of an activity and/or hotel. As used herein, "about," "approximately," or "roughly" refer to within ±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than." "less than" or "less than or equal to" applies to each of the numerical values in that series of numerical values. For example, less than or equal to 1, 2, or 3 is equivalent to less than or equal to 1, less than or equal to 2, or less than or equal to 3.

Surface Energy Impact Assessment System

The present disclosure pertains to a system (hereinafter "surface energy impact assessment system") of and method for assessing adhesion properties of an adhesion component of at least one TDS product using a skin-correlated probe. In an embodiment, the surface energy impact assessment system may be communicatively coupled with a computing device having at least one processor. In this manner, the at least one processor of the computing device of the surface energy impact assessment system may be communicatively coupled to at least one additive manufacturing device (e.g., 3D printer), a texture analyzer configured to be selectively coupled to the skin-correlated probe, and/or a display device.

Figure 1:
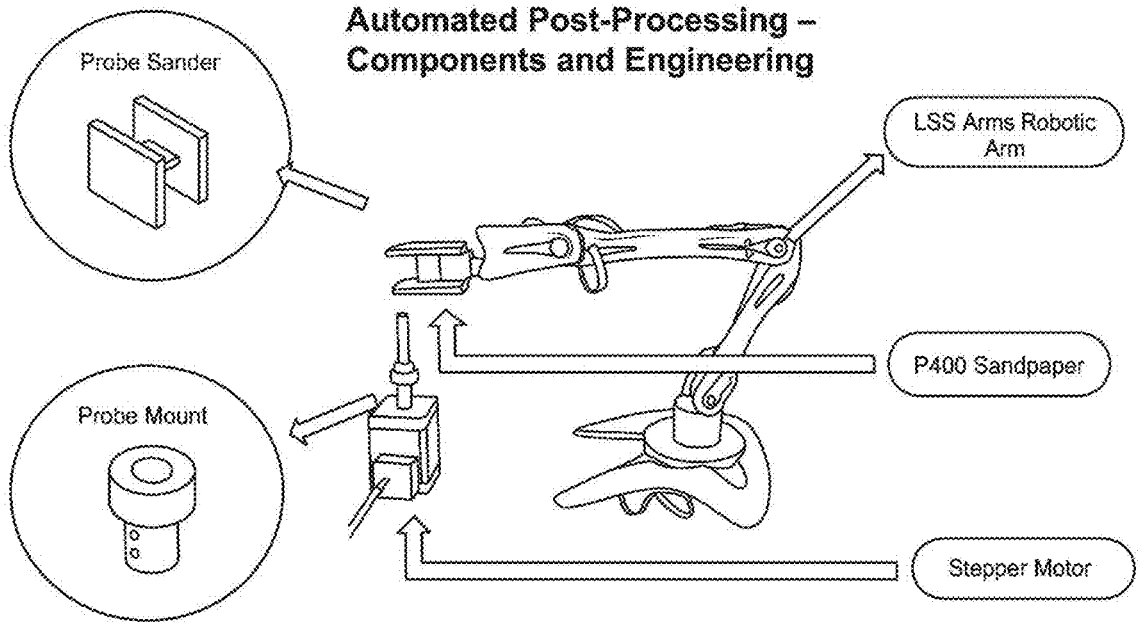
FIG. 1 is an image depicting an automated postprocessing setup for a texture analyzer of a surface energy impact assessment system, according to an embodiment of the present disclosure

As shown in FIG. 1, the texture analyzer of the surface energy impact assessment system may comprise, but is not limited to, at least one actuated clamp (e.g., a robotic arm (e.g., LSS Arm)) (e.g., to hold a skin-correlated probe sander), a high friction surface (e.g., P400 sandpaper (e.g., to remove deformation and/or to smoothen the skin-correlated probe), the skin-correlated probe sander (e.g., to hold the high-friction surface), a probe mount (e.g., to mount the skin-correlated probe on the motor), and/or at least one motor (e.g., to rotate the skin-correlated probe along the sandpaper surface for smoothening the probe surface). The surface energy impact assessment system comprising the additive manufacturing device and/or the texture analyzer may result in the skin-correlated probe comprising an identical surface like a stainless-steel probe as suggested by the similarity in surface energy in measured and/or reported values and/or reproductivity in tack testing of silicone PSAs. As such, in an embodiment, the skin-correlated probe may be postprocessed to achieve the identical surface (e.g., smooth and/or concave) with no deformations, via the skin-correlated probe sander, for use in the texture analyzer. In addition, in this embodiment, the texture analyzer may be configured to automatically analyze, in real-time, via at least one sensor communicatively coupled to the computing device, the peak-adhesion force for the adhesion component of the at least one TDS product, via the skin-correlated probe. In some embodiments, the texture analyzer may be configured to determine the peak-adhesion force for the adhesion component, via a memory of the computing device.

In an embodiment, the skin correlated probe may be configured to adhere to at least one TDS product, such that the adhesion properties of the at least one TDS product may be assessed. In this embodiment, the TDS product may comprise at least one adhesion component. The present disclosure will address the adhesion issues that the printed probes may address of the adhesion component of the at least one TDS product, which may be used for at least one 1 day. The system and method will be described in greater detail in the sections herein below.

In an embodiment, the skin-correlated probe may comprise a surface impact energy having a range of at least 10 dyne/cm to at most 80 dyne/cm, encompassing every integer in between. For example, in some embodiments, the skin-correlated probe has a surface impact energy of 25 dyne/cm. In this embodiment, the skin correlated-adhesion probe may comprise a surface impact energy of 32 dyne/cm. Accordingly, in this embodiment, skin-correlated probe may comprise, but is not limited to the following: polyethylene, polypropylene, poly(vinylidene fluoride), silicone, polyvinyl fluoride, poly (dimethyl-siloxane), fluorinated ethylene propylene, natural rubber, polychlorotrifluoroethylene, polybutylene terephthalate filaments, and/or any material known in the art comprising a surface impact energy having a range of at least 25 dyne/cm to at most 50 dyne/cm, encompassing every integer in between. For ease of reference, the exemplary embodiment described herein refers to polyethylene and/or polypropylene, but this description should not be interpreted as exclusionary of other skin-corelated materials.

Figure 3:
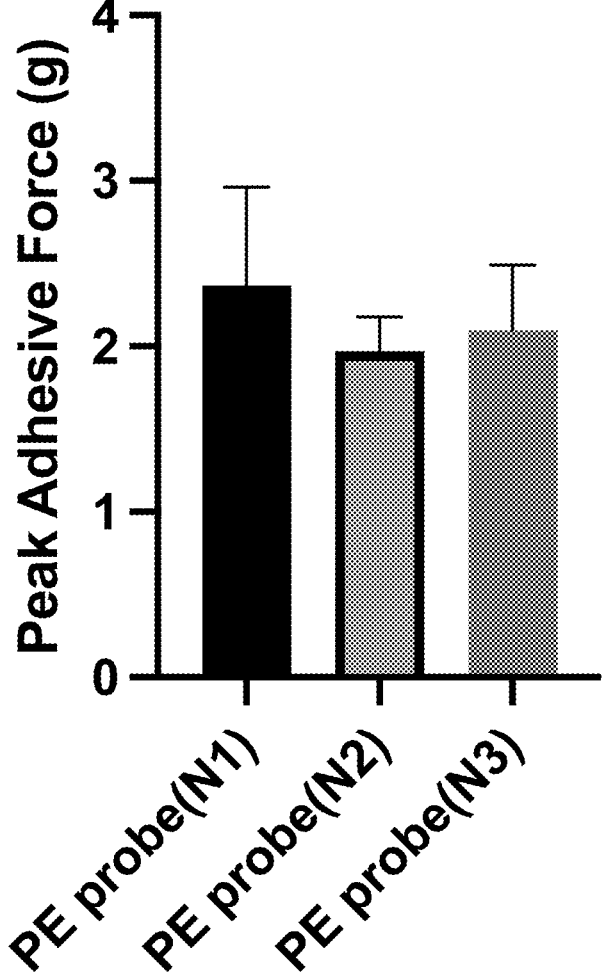
FIG. 3 is a graph illustrating a peak adhesive force to unbind a first polyethylene probe, a second polyethylene probe, and/or a third polyethylene probe, according to an embodiment of the present disclosure.

Furthermore, in an embodiment, as shown in FIG. 3, the skin-correlated probe may have a peak adhesion force comprising a range of at least 0.1 g to at most 25 g, encompassing every integer in between. For example, the peak adhesion force of the skin-correlated probe may comprise at most 2 g. In this embodiment, peak adhesion force refers to any force known in the art which may be used to unbind the skin-adhesion probe from the adhesive of the at least one adhesion component of the at least one TDS product. Additionally, as shown in FIG. 3, in conjunction with FIGS. 4A-7B, the skin-correlated probe may be configured to have substantially the same peak adhesion force, regardless of the material that may be used to fabricate the skin-correlated probe. For example, in some embodiments, when the skin-correlated probe is fabricated with either polyethylene, polypropylene, and/or both, no statistical significance exists between the peak-adhesion force required to separate the adhesion component of the at least one TDS and the skin-correlated probe. As such, in these other embodiments, both the polyethylene probe and the polypropylene probe may comprise a peak adhesion force having a range at least 5 g to at most 20 g. encompassing every integer in between.

Moreover, in an embodiment, the skin-adhesion probe may be configured to be fabricate by the following means, including but not limited to, additive manufacturing (e.g., 3D printing), plastic extrusion, injection molding, rotational molding, plastic extrusion and injection blow molding, vacuum casing, thermoforming and vacuum forming, and/or compression molding. For ease of reference, the exemplary embodiment described herein, refers to additive manufacturing, but this description should not be interpreted as exclusionary of other fabrication means.

As such, in an embodiment, the skin-correlated probe may first be created using additive manufacturing software (e.g., Autodesk fusion 360 software). In this manner, the 3D skin-correlated probe may then be imported into the additive manufacturing device (e.g., a 3D printer). Furthermore, in this embodiment, at least one polyethylene and/or polypropylene filament may then be fed into the additive manufacturing device (e.g., 3D printer), however, as noted above, any material known in the art comprising a surface impact energy having a range of at least 25 dyne/cm to at most 50 dyne/cm, encompassing every integer in between, may be used in fabricating the skin-correlated probe. Finally, the skin-correlated probe may then be printed after the calibrating and/or preheating the additive manufacturing device (e.g., a 3D printer).

FIGS. 4A-5B depict graphs illustrating a peak adhesive force required to unbind a polyethylene probe, a polypropylene probe, and a steel probe after contact with an adhesive, according to an embodiment of the present disclosure. As such, as shown in FIGS. 4A-5B, in an embodiment, an adhesion assessment results may comprise a significant ($p < 0.001$) increase in the adhesive force which may be required to unbind the stainless steel probe from the at least one adhesion component of the at least one TDS product as compared to the skin-correlated probe as depicted. Accordingly, in this embodiment, the ratio of the peak-adhesion force of the skin-correlated probe to the peak-adhesion force of the stainless steel probe (hereinafter "SK:ST") may comprise a range of at least 1:25 to at most 1:55, encompassing every integer in between. As such, in this embodiment, the skin-correlated probe may require a substantially less force to remove the adhesion component of the at least one TDS product from the skin-correlated probe, such that the skin-correlated probe may provide data more in-line with human skin, as compared to the stainless steel probe. In this manner, as the peak-adhesion force of the skin-correlated probe is substantially lower than the stainless steel probe, in some embodiments, the skin-correlated probe may be configured to be tested in real-time, such that the analysis may provide a clear in vitro and in vivo correlation, optimizing adhesion property analysis.

In an embodiment, when the skin-correlated probe comprises a coat weight of at least 10 mg/cm$^2$, the skin-correlated probe may comprise significantly higher adhesion property as compared to a skin-correlated probe comprising a coat weight of 5 mg/cm$^2$. As such, as the coat weight of the skin-correlated probe may increase, the adhesion property of skin-correlated probe may also increase.

Moreover, in an embodiment, the skin-correlated probe comprising the coat weight of at least 15 mg/cm$^2$ did not show significant difference in adhesion property as compared to 10 mg/cm$^2$. In this manner, in this embodiment, the skin correlated probe of the surface energy impact assessment system may comprise the coast weight of at most 10 mg/cm$^2$, optimizing the patch manufacturing.

Additionally, in an embodiment, the skin-correlated probe may comprise a surface free energy of at least 20.00 mN/m in peak adhesive force (e.g., 34.62 mN/m) as compared to a stainless steel (hereinafter "SS") probe (e.g., surface free energy of >700 mN/m). As such, surface energy of the skin-correlated probe surface may substantially affect the peak adhesive force obtained in tack test. In this manner, the surface free energy of the skin-correlated probe in peak adhesive force may be less than the surface free energy of the following including but not limited to, polyethylene, polypropylene, polytetrafluorethylene, stainless steel, glass, polycarbonate and/or poly (methyl methacrylate).

Method of Use

FIG. 2, in conjunction with FIGS. 3-16D, depicts an exemplary process-flow diagram providing a method of assessing an adhesion component of at least one TDS product using the skin-correlated probe. The steps delineated in FIG. 2 are merely exemplary of an order of assessing an adhesion component using the skin-correlated probe. The steps may be carried out in another order, with or without additional steps included therein.

As shown in FIG. 2, in conjunction with FIGS. 3-16D, in an embodiment, the method 200 begins at step 202, in which the skin-correlated probe may be provided. In this embodiment, the skin-correlated probe may be configured to be selectively coupled to a texture analyzer of the surface energy impact assessment system (e.g., a TA-XT plus) of a computing device. In addition, the skin-correlated probe may then be printed after the calibration and/or pre-heating of the additive manufacturing device. As such, as shown in FIG. 1, in conjunction with FIGS. 6A-6B and FIGS. 7A-7B, the skin-correlated probe may be post-processed using an automated robotic arm setup.

Next, at step 204, the adhesion component of at least one TDS product may be temporarily affixed to the skin-correlated probe. For example, in order to evaluate the skin-correlated probe, at least one adhesive may be used for the adhesive coating of the at least one TDS product. In this manner, in this embodiment, the at least one adhesive may comprise any adhesive known in the art which may be coated on a release liner comprising a range of at least 5±0.25 mg/cm$^2$ dry coat weight to at most 15±0.75 mg/cm$^2$ dry coat weight, encompassing every integer in between. In an embodiment, the adhesion component may be dried and/or heated at a predetermined temperature (e.g., 90° C.) for a predetermined period of time (e.g., 30 minutes). In addition, the release liner may be kept at room temperature for an alternative period of time (e.g., 5 min). Finally, in this embodiment, a backing membrane may also be laminated on the release liner. As such, the adhesive patches of 0.79 cm$^2$ were then cut and weighed to confirm the dry coat wight coated on the release liner Additionally, in some embodiments, the at least one adhesion component may comprise a silicone adhesives (e.g., an amine compatible adhesive and a non-amine compatible adhesive), such that the silicone adhesive may be used during the adhesion assessment.

As shown in FIG. 2, in conjunction with FIGS. 3-16D, at step 206, a force may be applied, via the texture analyzer, such that the adhesion component of the at least one TDS product may be separated from the skin-correlated probe. In addition, in this embodiment, as shown in FIGS. 3-16D, the skin-adhesion probe may also be tested against a stainless steel (SS) probe (e.g., TA-57R). Accordingly, before applying the force, the texture analyzer may first be calibrated to a predetermined force and/or a predetermined distance before the adhesion assessment may commence. Furthermore, in this embodiment, the texture analyzer may comprise a pre-test speed, a test speed, a post test speed, an applied force, a return distance, a contact time, and/or a trigger force. Accordingly, in this embodiment the pre-test speed may have a speed comprising a range of at least 0.1 mm/sec to at most 1.5 mm/sec. encompassing every integer in between. Additionally, the test speed may also comprise a speed having a range of at least 0.1 mm/sec to at most 1.5 mm/sec, encompassing every integer in between. The post-test speed may comprise a speed having a range of at least 0.1 mm/sec to at most 2.5 mm/sec. encompassing every integer in between.

In this manner, in an embodiment, the applied force used in the adhesion assessment may comprise a range of at least 0.1 g to at most 5 g, encompassing every integer in between. As such, in this embodiment, the texture analyzer may be configured to temporarily affix the skin-correlated probe to the adhesion component for a predetermined amount of time. For example, the texture analyzer may be configured to temporarily affix the skin-correlated probe to the adhesion component for at least 5 seconds. In addition, in some embodiments, the texture analyzer may comprise a trigger force of at least 0.2 g.

Additionally, as shown in FIGS. 3-16D, in an embodiment, the texture analyzer of the surface energy impact assessment system may comprise a testing liquid. In this embodiment, the texture analyzer may be configured to deposit a predetermined amount of liquid (e.g., droplets of 5 μL volume of water and/or 3 μL of diiodomethane) on to the skin-correlated probe. As such, the texture analyzer of the surface energy impact assessment system, via at least one camera and/or sensor communicatively coupled to the texture analyzer, ma be configured to record the drop placement onto the skin-correlated probe. In some embodiments, the texture analyzer may automatically record the audio, video, and/or tactile response of the drop placement onto the skin-correlated probe, using an automated video recording function and/or algorithm.

In this manner, in an embodiment, the texture analyzer may automatically and/or in real-time calculate at least one contact angle for each image using the ellipse fitting. The average of calculation from the final drop images which remain stable and/or unchanged (e.g., a static contact angle) after the droplet was deposited on the surface may be transmitted to the computing device of the surface energy impact assessment system communicatively coupled to the texture analyzer. Additionally, in some embodiments, at least four (4) to twenty (20) measurements may be taken by the texture analyzer from the images of static drop remained on the sample to give the average value. In these other embodiments, the obtained contact angle of liquids on the samples may then be fitted into surface energy calculation window using Wu (e.g., a harmonic mean) function and/or algorithm.

Moreover, as shown in FIG. 2, in conjunction with FIGS. 3-16D, at step 208, the texture analyzer may be configured to analyze a peak-adhesion force of the skin-correlated probe, the adhesion component of the at least one TDS product, and/or both. As such, in an embodiment, the surface energy impact assessment system, via the at least on processor, may be configured to automatically compare, in real-time, the analyzed peak-adhesion force of the skin-correlated probe with at least one predetermined peak-adhesion force (e.g., a peak adhesion force of the stainless steel probe). Additionally, in this embodiment, the surface energy impact assessment system may be configured to automatically compare, in real-time, the analyzed peak-adhesion force and/or at least one alternative analyzed peak-adhesion force, such that the analyzed peak-adhesion force comprising the lowest peak-adhesion force may be determined by the surface energy impact assessment system.

Furthermore, at step 210, via a processor of the computing device, the texture analyzer may be configured to transmit to document and transmit the peak-adhesion force to a recording element of the computing device. In addition, the texture analyzer may also be configured to transmit the peak-adhesion force to a display device communicatively coupled to the computing device, such that the peak-adhesion force may be visualized on the display device (e.g., a plot, a graph, a 3D image and/or model, etc.). In this manner, in an embodiment, when the peak-adhesion force is transmitted to the display device, via the at least one processor, the computing device may be configured to transmit a notification indicative of optimized prediction of in vitro in vivo correlation based on the transmitted peak-adhesion force. Moreover, in this embodiment, the at least one processor may be configured to transmit the notification via any auditory, visual, and/or tactile means known in the art.

Finally, at step 212, in an embodiment, subsequent to the peak-adhesion force being transmitted to the recording element of the computing device, the recording element may be configured to record the peak-adhesion force in the memory of the computing device and/or transmit. In this manner, in this embodiment, the surface energy impact assessment system may be configured to compare the recorded peak-adhesion force to at least one alternative peak adhesion force determined by the texture analyzer. Accordingly, based on a determination that the recorded peak adhesion force may be lower than the alternative analyzed peak adhesion force and/or a predetermined peak adhesion force (e.g., the peak adhesion force of the stainless steel probe), the surface energy impact assessment system may be configured to transmit a notification indicative of recommending use of the skin-correlated probe associated with the recorded peak adhesion force. In this manner, based on a determination that the recorded peak adhesion force may be higher than the alternative analyzed peak adhesion force and/or the predetermined peak adhesion force (e.g., the peak adhesion force of the stainless steel probe), the surface energy impact assessment system may be configured to transmit a notification indicative of not recommending use of the skin-correlated probe associated with the recorded peak adhesion force The following examples are provided for the purpose of exemplification and are not intended to be limiting.

EXAMPLES

Example 1

Figure 4A:
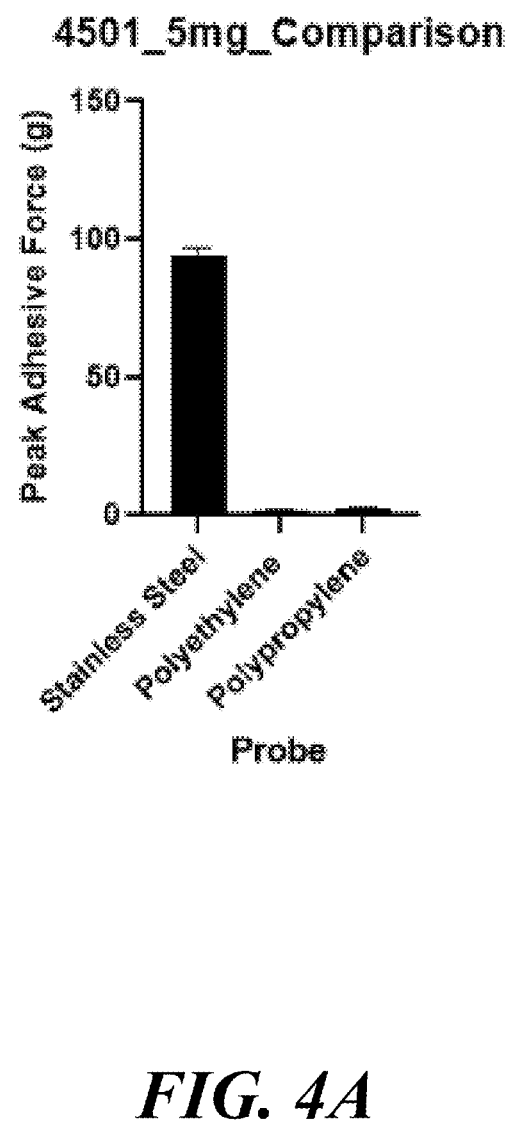
Figure 4B:
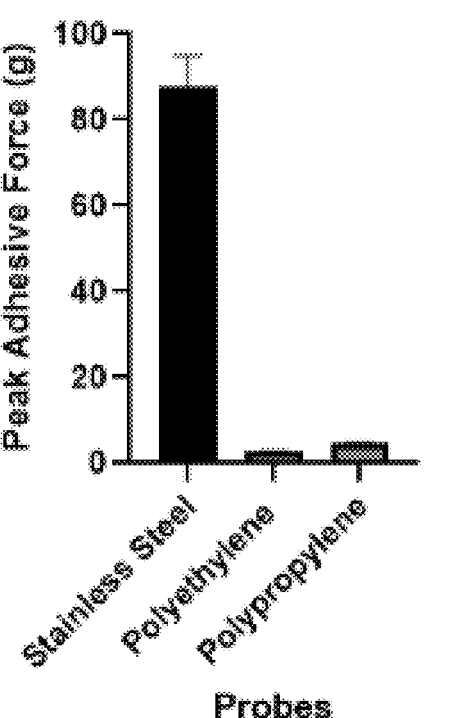

Peak Adhesion Force Analysis of Polyethylene, Polypropylene, and Stainless Steel Probes on 4501-Amine Compatible Adhesive As shown in FIG. 4A, when the adhesion component comprises a 5 mg coating and the skin-correlated probe is fabricated from polyethylene, the stainless steel probe comprises a substantially higher peak-adhesion force of $94.01 \pm 2.93$ g, in contrast to the peak-adhesion force of the skin-correlated probe of $2.12 \pm 0.11$ g. Furthermore, as shown in FIG. 4A, in another example when the adhesion component comprises a 5 mg coating and the skin-correlated probe is fabricated from polypropylene, the skin-correlated probe comprises a substantially reduced peak adhesion force of $2.89 \pm 0.05$ g, as compared to the peak adhesion force of the stainless steel probe. Additionally, in these examples, as shown in FIG. 4B, when the at least one adhesion component comprises a 10 mg coating, the force for the stainless steel probe, the polyethylene skin-correlated probe, and the polypropylene skin-correlated probe may be found to be $94.01 \pm 1.54$ g, $2.66 \pm 0.19$ g, $4.55 \pm 0.25$ g, respectively. Additionally, as shown in FIGS. 6A-6B, the polyethylene skin-correlated probe and the polypropylene skin-correlated probe show no significant effect on adhesive force required to unbind the probe from the 4501-amine compatible adhesive. Accordingly, no statistical significance was presented between the 5 mg and the 10 mg coating of the 4501 adhesive.

Example 2

Figure 5A:
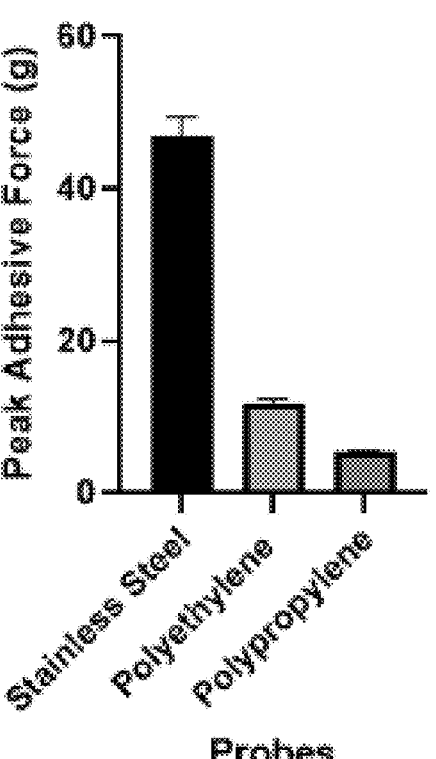
FIGS. 5A-5B are graphs illustrating a peak adhesive force required to unbind a polyethylene probe, a polypropylene probe, and/or a steel probe after contact with an adhesive, according to an embodiment of the present disclosure.
Figure 5B:
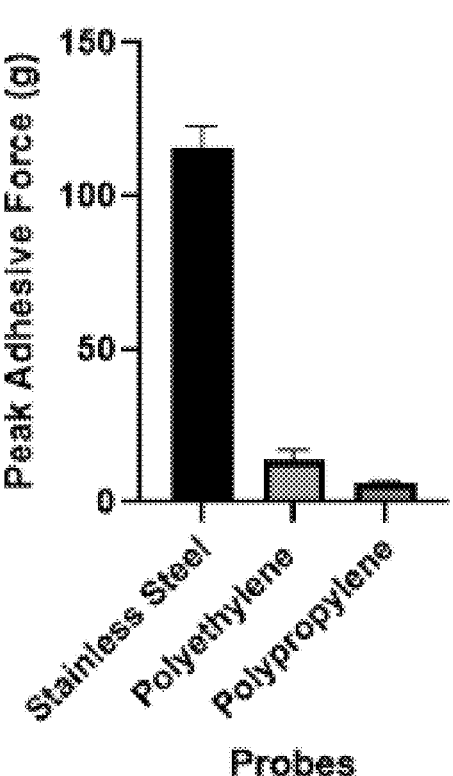

Peak Adhesion Force Analysis of Polyethylene, Polypropylene, and Stainless Steel Probes on 4302-Non-Amine Compatible Adhesive As shown in FIG. 5A, when the adhesion component comprises a 5 mg coating and the skin-correlated probe is fabricated from the stainless steel probe comprises a peak-adhesive force of $47.02 \pm 2.38$ g, in contrast to the peak-adhesive force of the skin-correlated probe (polyethylene) of $11.72 \pm 0.58$ g. Additionally, as shown in FIG. 5A, when the adhesion component comprises a 5 mg coating and the skin-correlated probe is fabricated from polypropylene, the skin-correlated probe comprises a substantially reduced peak adhesion force of $5.45 \pm 0.21$ g. Furthermore, as shown in FIG. 5B, when the at least one adhesion component comprises a 10 mg coating, the force for the stainless steel probe, the polyethylene skin-correlated probe, and the polypropylene skin-correlated probe may be found to be $116.21 \pm 6.90$ g, $14.20 \pm 2.94$ g, $6.72 \pm 0.27$ g for stainless steel, polyethylene and polypropylene probes respectively. Additionally, as shown in FIGS. 7A-7B, the polyethylene skin-correlated probe and the polypropylene skin-correlated probe show no significant effect on adhesive force required to unbind the probe from the 4302 non-amine compatible adhesive. Accordingly, no statistical significance was presented between the 5 mg and the 10 mg coating of the 4302 adhesive.

Example 3

Materials and Methods for Evaluating Adhesion Properties of Transdermal Systems (TDS) Based on Orientation and Micro Delamination of Novel 3D Printed Probe This example describes the materials and methods used for the studies described in Example 4.

Orientation of Probe Printing:

STL file of the probe (Dimensions: 7 mm diameter with 1" radius) was first created using Autodesk fusion 360 software. The STL file was then imported in the 3D FDM MethodX printer. Acrylonitrile butadiene styrene (ABS) filaments were then fed in the printer. The skin-correlated probes (hereinafter "Probe(s)") were printed in vertical and horizontal orientation with optimized parameters including infill of 100%, nozzle and platform temperature of 220° C. and 35° C. respectively and print and fan speed of 100%. Further, as shown in FIG. 8A, and FIG. 8B the probes were post-processed using automated robotic arm setup.

Micro Delamination of Probe Printing:

Computer aided design (CAD) was first created in Autodesk fusion 360 software. Ellipse of 2 mm (minor axis), 4 mm (major axis) and 40 μm depths were included in the probe surface design. As shown in FIG. 8A, FIG. 8B, and FIG. 9, 4 micro delaminations were formed on the surface. The size of the micro delaminations were created considering 10-40 μm thick stratum corneum epidermal layer peels off in this condition. Probes were printed in horizontal orientation with optimized parameters including infill of 100%, nozzle and platform temperature of 220° C. and 35° C. respectively and print and fan speed of 100%. Further, the probes were post-processed using automated robotic arm setup.

Example 4

Quantification and Statistical Analysis of Adhesion Properties of Transdermal Systems (TDS) Based on Orientation and Micro Delamination of Novel 3D Printed Probe Effect of Orientation of Probe Printing:

ABS Probe printed in vertical orientation results in uneven and rough surface. On the other hand, probe printed in horizontal orientation results in smoother and concave surface as shown in the optical microscopic images, as shown in FIG. 8A and FIG. 8B. Therefore, probes printed in horizontal orientation were used for probe tack testing.

Effect of Micro Delamination on Adhesion:

Results showed that the peak adhesive force was significantly ($p<0.05$) decreased in case of micro delaminated probe as compared to probe without micro delamination. Moreover, as shown in FIG. 10, probe with 4 micro delamination showed significant decrease ($p<0.05$) in adhesion property as compared to probe with 1 and 2 micro delamination. These indicates that skin conditions such as micro delamination significantly reduces the patch adhesion property

Example 5

Materials and Methods for Evaluating Adhesion Properties of Transdermal Systems (TDS) Using Novel 3D Printed Probe This example describes the materials and methods used for the studies described in Example 6 and Example 7.

Materials:

Polypropylene filaments were obtained from Braskem B, PA, USA, All the silicone PSAs including Liveo BIO-PSA 4501, 4202, 4502, 4602, 4102, and 4302 were gifted by DuPont, CA, USA. Texture analyzer (TA.XTPlus) and TA-57R stainless steel probe was purchased from Texture Technologies Corp. and Stable Micro Systems, Ltd, MA, USA. Ethyl acetate was obtained from Sigma-Aldrich, MO, USA, Elcometer 3580/1 casting knife film applicator (width: 50 mm) was obtained from Elcometer Inc. MI, USA. Jet mounter JM18 electric 18 Inch pressure sensitive cold mount was procured from My Binding LLC, OR, USA. 3M Scotchpak™ 9735, 9733, 9723 backing polyester film laminate and 3M Scotchpak™ 9744 release liner fluoropolymer coated polyester film were gifted by 3M, MN, USA. Dremel printer was procured from Dremel, IL, USA.

Methods:

Adhesive Coating:

To evaluate the adhesion properties of coated PSAs, silicone amine and non-amine compatible adhesives including Liveo BIO-PSA 4102, 4202 and 4302 and Liveo BIO-PSA 4501, 4502 and 4602 were coated on a release liner (9744) with 5±0.25 mg/cm², 10±0.5 mg/cm², 15±0.75 mg/cm² dry coat weight. Adhesives were then dried at 90° C. for 30 minutes in the oven. Release liners were then kept at room temperature for 5 min. Finally, backing membrane (9733/9723/9735) was laminated on the release liners using the laminator. Adhesive patches of 0.79 cm² were then cut and weighed to confirm the dry coat wight coated on the release liner.

Probe Track Test:

All the adhesives were evaluated for their adhesive properties in probe tack test using a texture analyzer (TA-XT plus). All the adhesives were tested using industrial standard TA-57R stainless steel probe, and polypropylene (PP) filament 3D printed probes. The instrument was first calibrated for force and distance. Patches were then analyzed using pre-test speed: 0.5 mm/sec, test speed: 0.5 mm/sec, post-test speed: 1 mm/sec, applied force: 0.5 g, return distance: 10 mm, contact time: 10 sec and trigger force: 0.3 g. force vs Distance graphs were then obtained and used for calculating the peak adhesive force.

3D Printing and Postprocessing of Probes:

STL file of the skin-correlated probe (hereinafter "probe(s)") (Dimensions: 7 mm diameter with 1" radius) was first created using Autodesk fusion 360 software. The STL file was then imported in the 3D FDM Dremel printer. Polypropylene (PP) filaments were then fed in the FDM Dremel printer. Probes were then printed after the calibration and pre-heating of the printer. Further, the probes were post-processed using automated robotic arm setup, as shown in FIG. 1 and FIGS. 15A-15C.

Probe Surface Energy Measure Measurement:

All the probe samples were analyzed by Future Digital Scientific Corp, NY, USA using A KUDOS DropMeter® A290 Optical contact angle device with Windows 10 based software (TrueDrop®). Briefly, sample was placed on a sample stage of the KUDOS A290 device, 500 μl micro syringe filled with testing liquid was used for the surface energy measurement. Droplets of 5 μL volume of Water and 3 μL of Diiodomethane were deposited on the sample surface. The entire procedure of the drop placement onto the sample surface was recorded using an automated video recording function. The contact angles were automatically calculated for each image using the ellipse fitting. The average of calculation from the final drop images which remain stable and unchanged (static contact angle) after the droplet was deposited on the surface. At least 6-8 measurements were taken from the images of static drop remained on the sample to give the average value. Obtained contact angle of liquids on the samples were fitted into surface energy calculation window using Wu (harmonic mean) method.

Example 6

Quantification and Statistical Analysis of Adhesion Properties of Transdermal Systems (TDS) Using Novel 3D Printed Probe Effect of Coat Weight on Adhesive Properties of PSAs on Non-Elongated Surface (e.g., Glass):

Briefly, amine compatible PSAs: 4102, 4202 and 4302 and non-amine compatible PSAs: 4501, 4502 and 4602 were selected to evaluate the effect of coat weight (non-elongated glass surface) on adhesion properties of PSAs. As shown in FIG. 11A, PSA 4302 resulted in peak adhesive forces of 55.41±5.49, 74.39±10.46, and 82.97±12.43 g for 5±0.25 mg/cm$^2$, 10±0.5 mg/cm$^2$, 15±0.75 mg/cm$^2$ coat weights respectively. As shown in FIG. 11B, PSA 4501 resulted in peak adhesive forces of 55.41±5.49, 74.39±10.46, and 82.97±12.43 g for 5±0.25 mg/cm$^2$, 10±0.5 mg/cm$^2$, 15±0.75 mg/cm$^2$ coat weights respectively. Results showed significant (p<0.05) increase in peak adhesive force in 10±0.5 mg/cm$^2$ coated 4302 and 4501 PSAs as compared to 5±0.25 mg/cm$^2$ coating. Moreover, no significant difference was found in peak adhesive force in 15±0.75 mg/cm$^2$ and 10±0.5 mg/cm$^2$ coating, as shown in FIG. 11A and FIG. 11B. All silicone PSAs including amine compatible: 4202 and 4302 and non-amine compatible: 4501, 4502 and 4602 showed significantly higher peak adhesive force at all coating weights (5, 10 and 15 mg/cm$^2$) as compared to 4102. Additionally, as shown in FIG. 11C, no significant difference was observed in peak adhesive force in case of PSA 4102, 4202 and 4502 at all coating weights (5, 10 and 15 mg/cm$^2$).

Effect of Coat Weight on the Adhesive Properties of PSAs on 100% Elongated Backing Membrane (9735):

Amine compatible PSAs: 4102, 4202 and 4302 and non-amine compatible PSAs: 4501, 4502 and 4602 were selected to evaluate the effect of coat weight on 100% elongated backing membrane 9735 for their adhesion properties. Results demonstrated that unlike PSA 4202 which showed no significant difference in the tack properties at 5, 10 and 15 mg/cm$^2$ coating, other amine compatible PSAs: 4102 and 4302 showed significant (p<0.05) increase in peak adhesive force at 10 and 15 mg/cm$^2$ as compared to 5 mg/cm$^2$ coating. Whereas except 4602 which showed increased peak adhesive force at 10 and 15 mg/cm$^2$ as compared to 5 mg/cm$^2$ coating, other non-amine compatible PSAs: 4501 and 4502 didn't show difference in peak adhesive force at 5, 10 and 15 mg/cm$^2$ coating. No significant difference was observed in peak adhesive force at 10 and 15 mg/cm$^2$ coating in all amine and non-amine compatible PSAs, as shown in FIGS. 12A-12F.

Effect of Backing Membrane Elongation on the Adhesive Properties of Amine and Nonamine Compatible PSAs:

The amine compatible PSA 4202 and 4302 and non-amine compatible PSA 4501 were selected for evaluating the effect of backing membranes on adhesion properties. The data showed no significant difference in tack properties of PSA 4202 and 4302 at 5, 10 and 15 mg/cm$^2$ coating on backing membranes 9733, 9723 and 9735 with elongation of 70, 75 and 100%. However, significant increase in peak adhesive force was observed for PSA 4202 at 5 mg/cm$^2$ and PSA 4302 at 10 and 15 mg/cm$^2$ coating in all backing membranes (9733, 9723 and 9735) as compared to glass surface. Amine compatible PSA 4501 also showed significant increase in peak adhesive force at 5, 10 and 15 mg/cm$^2$ coating in all backing membranes 9733, 9723 and 9735 as compared to glass surface. However, as shown in FIG. 13A, FIG. 13B, and FIG. 13C, like PSA 4202 and 4302, PSA 4501 didn't show any significant difference in tack properties at 5, 10 and 15 mg/cm$^2$ coating in all backing membranes (9733, 9723 and 9735) with elongation 70, 75 and 100%.

Effect of Viscosity on the Adhesive Properties of Amine and Nonamine Compatible PSAs:

Amine compatible PSAs: 4102, 4202 and 4302 and non-amine compatible PSAs: 4501, 4502 and 4602 were selected to evaluate the effect of viscosity and complex viscosity of PSAs on adhesion properties. PSAs: 4102, 4202, 4302, 4501, 4502 and 4602 have viscosity of 300, 700, 900, 1800, 1800 and 1900 mPaS. The data showed that PSA 4102 with the lowest viscosity of 300 mPaS. showed significantly (p<0.0001) low peak adhesive force required to unbind the adhesive surface as compared to all other amine and non-amine PSAs including 4202, 4302, 4501, 4502 and 4602 at 5, 10 and 15 mg/cm$^2$ coating. PSAs including 4501, 4502 and 4602 with similar viscosity of 1800-1900 mPaS showed no significant difference in the tack properties of the adhesives at 5, 10 and 15 mg/cm$^2$ coating. Additionally, as shown in FIG. 14A and FIG. 14B, both PSAs 4202 and 4302 (with viscosity in the range of 700-900 mPaS) showed relatively low peak adhesive force required to unbind the probe from the adhesive surface at 5 and 10 mg/cm$^2$ coating as compared to PSAs with higher viscosity range of 1800-1900 mPaS.

Printing PP Probe Using 3D Printer and its Surface Energy Measurement

PP probe was printed using FDM 3D printer as shown in FIGS. 15A-15C, and surface energy was measured using KUDOS DropMeter A290 with All-in-one Software True-Drop®. When the de-ionized (hereinafter "DI") water and diiodomethane droplets were placed on the probe surface, an average contact angles of polypropylene (hereinafter "PP") probe were determined to be 48.08° and 49.50° respectively. Moreover, the polar, non-polar and total surface energy were found to be 0.46, 34.16 and 34.62 mN/m respectively.

Evaluation of 3D Polypropylene (PP) Probe Vs Stainless-Steel (SS) Probe in Adhesion Testing:

Amine compatible (PSA-4302) and non-amine compatible (PSA-4501) silicone adhesives were coated on a backing membrane with the dry coat weight of 10 mg/cm$^2$. Probe tack test results of amine compatible (PSA-4302) adhesive showed significant (p<0.001) increase in the adhesive force (116.21±6.90 g) required to unbind the industrial standard TA-57R stainless steel probe from the adhesive as compared to polypropylene probe (6.72±0.27 g). Similarly, non-amine compatible adhesive (PSA-4501) showed adhesive force of 94.01±1.54 g and 4.55±0.25 g for stainless steel and polypropylene probes respectively. As such, as shown in FIG. 15D and FIG. 15E, the results suggest that as the surface energy of the probe increased, peak adhesive force required to unbind the probe from the surface was also increased.

Evaluation of 3D Probe on Effect of Coat Weight

Briefly, amine compatible (PSA-4302) and non-amine compatible (PSA-4501) silicone adhesives were coated on a backing membrane with the dry coat weight of 5 and 10 mg/cm$^2$ to evaluate the effect of coat weight on adhesion properties of PSAs using both SS and PP probes. The SS probe results showed that PSA-4302 resulted in significant (p<0.05) increase of peak adhesive force at 10 mg/cm$^2$ coat weight as compared to for 5 mg/cm$^2$. However, PSA-4501 didn't show significant difference in both 5 and 10 mg/cm$^2$ coat weights. On the other hand, as shown in FIGS. 16A-16D, PP results showed significant (p<0.001) increase in peak adhesive force at 10 mg/cm$^2$ coat weight as compared to 5 mg/cm$^2$ in both PSA-4302 and 4501.

Example 7

3D Printed Polypropylene (PP) Probe Mediate Successful In Vitro Adhesion Testing of TDS for Better In Vitro In Vivo Correlation TDS product development is a complex process and requires optimal balance between adhesive and cohesive forces to achieve optimized transdermal formulation. The exposure of transdermal formulation to various extrinsic and intrinsic factors leads to imbalance in these forces and also a lack of understanding of skin-adhesive interfacial interactions has led to failures of many patches (e.g. Rotigotine (Neupro) and Rivastigmine (Exelon) (FDA 2006, Novartispharmaceutical 2018). These patches fall off earlier than their prescribed time duration and hence fail in the marketplace. It is well known that intrinsic factors including coat weight, viscosity of PSAs, excipients, backing membrane, size, shape and adhesive type affect adhesion properties of TDS products. Additionally, extrinsic factors including temperature and humidity may also be responsible for patches failure. Surprisingly, no detailed study has been conducted to understand the impact of these intrinsic and extrinsic factors on adhesion changes occurring in the patch components (Cilurzo, Gennari et al. 2012).

Furthermore, the current in-vitro methods of evaluation are based on stainless steel probe which has a higher surface energy (>700 mN/m) than skin and hence may not be very predictive of adhesion properties of the TDS products. The effect of various intrinsic factors including coat weight, viscosity of pressure-sensitive adhesives (PSAs) and backing membrane on adhesion properties of silicone PSAs was evaluated. In addition to this, methods to improve the in-vitro adhesion testing of the TDS products were also investigated by fabricating probes with similar surface energy as human skin using 3D printing technology for the better prediction of IVIVC.

The results revealed that coat weight of 10 mg/cm$^2$ showed significantly higher adhesion property as compared to 5 mg/cm$^2$ which suggests that as the coat weight increased, adhesion property of PSAs also increased. This might be because of the increase in PSA coating thickness (in case of 10 mg/cm$^2$), which resulted in higher adhesive force as compared to 5 mg/cm$^2$ coat weight. The TDS products manufactured by pharmaceutical industries generally have 10 mg/cm$^2$ coat weight.

The results showed that coat weight of 15 mg/cm$^2$ did not show significant difference in adhesion property as compared to 10 mg/cm$^2$ which suggests 10 mg/cm$^2$ coat weight is optimal for the patch manufacturing. Additionally, patches may become heavy which may lead to adhesion failure. Therefore, the results suggest that the coat weigh of TDS products should not exceed 10 mg/cm$^2$.

The data also showed that backing membranes with elongation of 70-100% didn't show significant effect on adhesion properties of silicone PSAs. This could be because the coated PSAs were analyzed for adhesion testing right after the PSAs were coated. It has been reported that backing membrane affects the drug permeation into the systemic circulation (Lv, Quan et al. 2016). Backing polyester film laminates 9735, 9733 and 9723 have oxygen transmission of 100, 80 and 80 cc/m$^2$/24 h respectively and elongation of 100, 50, and 75% respectively. Difference in breathability (oxygen transmission rate) and elongation properties of the backing membrane may affect the adhesion properties of silicone PSAs when exposed to extrinsic factors including humidity and temperature. Therefore, no significant difference was found in adhesion properties of silicone PSAs coated on different backing membranes (9735, 9733 and 9723).

Data from effect of viscosity revealed that amine compatible PSAs 4102 showed significantly (p<0.001) low adhesion properties as compared to other amine compatible PSAs including 4202 and 4302 which suggests PSA 4202 and 4302 would be ideal choice for amine compatible APIs to achieve high tack properties. The low adhesion properties of PSA 4102 could be due its low viscosity as compared to PSA 4202 and 4302. Furthermore, non-amine compatible PSAs including 4501, 4502 and 4602 which don't have significant difference in their viscosity showed identical adhesion properties in probe tack testing. This suggests any non-amine PSA: 4501, 4502 and 4602 can be used for non-amine compatible APIs to achieve high tack properties.

The results of surface energy measurement of PP probe showed no significant difference in the measured (34.62 mN/m) and reported value (32 mN/m) of surface energy (Schreier, Traßl et al. 2014). It is suggested that deformations (unevenness or holes on the surface) affect the contact angle measurement of polar (water) and non-polar (Diiodomethane) solvent which leads to variation in surface energy measurements. Therefore, it was important to evaluate the surface energy of probe surface to confirm that the surface has no deformations.

The tack test results of silicone PSAs using PP probe with surface free energy of 34.62 mN/m showed significant (p<0.001) reduction in peak adhesive force as compared to SS probe (surface free energy of >700 mN/m) which strongly suggests that surface energy of a probe surface substantially affected the peak adhesive force obtained in tack test. Similar observations were also reported for acrylic pressure sensitive adhesives crosslinked using polyethylene, polypropylene, polytetrafluorethylene, stainless steel, glass, polycarbonate and poly (methyl methacrylate). It was observed that as the surface energy of the material increased, tack property was also increased (Kowalski, Czech et al. 2013). Although, they demonstrated the relation of tack and the surface free energy, the various types of FDA approved PSAs including silicone used in marketed transdermal patches were not tested. Moreover, they modified adhesives by crosslinking using different materials such as glass and then studied tack properties of these modified adhesives.

The FDA approved silicone PSAs were analyzed for their tack properties using 3D printed PP probe. These PP probes were printed using FDM printer with similar dimensions of SS probe and optimized parameters including infill of 100%, nozzle and platform temperature of 220° C. and 35° C. respectively and print and fan speed of 100%. The preliminary printing data revealed that percent infill below 100% results in probes with significant holes on the surface. Therefore, probes were printed at 100% infill along with other optimized parameters. As the resulted probe's surface was uneven unlike industrial standard SS probe, the 3D printed PP probe surface was required to be postprocessed to match the SS probe surface. Moreover, manual smoothening of the surface using P400 sandpaper resulted in variations in tack testing on silicone PSAs. Therefore, it was crucial to create an automated postprocessing setup to avoid human errors and achieve reproducibility in the tack testing.

The printed PP probes were postprocessed to achieve identical surface (smooth and concave) with no deformations using automated setup which includes Robotic arm (LSS Arm) (to hold the probe sander), P400 sandpaper (to remove deformation and smoothen the probe), probe sander (to hold the sandpaper), probe mount (to mount the probe on the stepper motor) and stepper motor (to rotate the probe along the sandpaper surface for smoothening the probe surface). The optimized printing and postprocessing process resulted in PP probe with identical surface like SS probe as suggested by the similarity in surface energy in measured and reported values and reproductivity in tack testing of silicone PSAs.

Results from in vitro adhesion testing using PP probe showed significant (p<0.001) increase in adhesion properties of amine compatible PSA 4302 at 10 mg/cm² as compared to 5 mg/cm² coating with low variations (standard deviation) in the tack results unlike SS probe which showed similar phenomenon with high variation (standard deviation) in tack results. Furthermore, non-amine compatible PSA 4501 showed significant (p<0.001) increase in adhesion properties at 10 mg/cm² as compared to 5 mg/cm² coating unlike SS probe which didn't show any difference in tack results at 5 and 10 mg/cm². This indicates that PP probe having similar surface characteristics like skin could be used for better in vitro in vivo correlation of adhesion performance of TDS products with high reproducibility in tack results.

Overall, systematic experiments were performed to evaluate the effect of intrinsic factors: coat weight, backing membrane and viscosity on adhesion properties of FDA approved silicone PSAs. Further, novel PP probe with identical surface of SS probe was optimized and printed using 3D printing FDM technology. Tack testing results of silicone PSAs using PP probe indicates that PP probe could be a promising approach for testing TDS products to predict in-vivo adhesion properties which can avoid the patch adhesion failures.

In conclusion, the results showed that coat weight of the silicone PSAs significantly affected their adhesion properties from 5 to 10 mg/cm² coating. Elastic properties of the backing membranes didn't affect the adhesion properties of silicone PSAs. However, silicone PSAs showed significantly low adhesion properties when coated on non-elongated surface (glass) as compared to elongated surface (backing membrane). Further, adhesion characteristics of PSAs were not affected by choice of different backing membrane with different elongation properties. Further, viscosity of PSAs had a significant impact on their adhesion properties. Moreover, surface energy of the probe also significantly affected the peak adhesive force in probe tack test. The automated robotic arm postprocessing setup successfully eliminated the deformations of the PP probe's surface which resulted in reproducibility in tack results. The novel 3D printed PP probes showed significantly low peak adhesive force as compared to stainless-steel probe in probe tack test suggesting that it could be used for adhesion testing of TDS for better prediction of in vitro in vivo correlation The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Kowalski, Arkadiusz, et al. "How Does the Surface Free Energy Influence the Tack of Acrylic Pressure-Sensitive Adhesives (PSAS)?" *Journal of Coatings Technology and Research*, vol. 10, no. 6, 2013, pp. 879-885.

Charkoudian, John, "A Model Skin Surface for Testing Adhesion to Skin" *Journal of the Society of Cosmetic Chemists*, vol. 39, 1988, pp. 225-234.

3M (2023). "https://www.3m.com/3M/en_US/bonding-and-assembly-us/resources/science-of-adhesion/categorizing-surface-energy/."

Arnet, I., et al. (2016). "Poor adhesion of fentanyl transdermal patches may mimic end-of-dosage failure after 48 hours and prompt early patch replacement in hospitalized cancer pain patients." Journal of pain research: 993-999.

Arnet, I., et al. (2016). "Poor adhesion of fentanyl transdermal patches may mimic end-of-dosage failure after 48 hours and prompt early patch replacement in hospitalized cancer pain patients." Journal of pain research 9: 993.

Boehringer-Ingelheim (2016). "https://docs.boehringer-in-gelheim.com/Prescribing%20Information/PIs/Catapres%20TTS/CatapresTTS.pdf."

Cilurzo, F., et al. (2012). "Adhesive properties: a critical issue in transdermal patch development." Expert opinion on drug delivery 9(1): 33-45.

Elshoff, J.-P., et al. (2018). "Randomized, double-blind, crossover study of the adhesiveness of two formulations of rotigotine transdermal patch in patients with Parkinson's disease." Current Medical Research and Opinion 34(7): 1293-1299.

FDA (2006). "https://www.accessdata.fda.gov/drugsatf-da_docs/label/2007/021829lbl.pdf."

Jafri, I., et al. (2019). "Effect of permeation enhancers on in vitro release and transdermal delivery of lamotrigine from Eudragit® RS100 polymer matrix-type drug in adhesive patches." Progress in biomaterials 8(2): 91-100.

Liu, C., et al. (2017). "A systemic evaluation of drug in acrylic pressure sensitive adhesive patch in vitro and in vivo: the roles of intermolecular interaction and adhesive mobility variation in drug controlled release." Journal of controlled release 252:83-94.

Lv, S., et al. (2016). "Effect of backing films on the transdermal delivery of cyclobenzaprine patch." Asian journal of pharmaceutical sciences 11(6): 780-783.

Novartis-pharmaceutical (2018). "https://www.no-vartis.com/us-en/sites/novartis_us/files/exelonpatch.pdf."

Schreier, P., et al. (2014). Surface modification of polypropylene based particle foams. AIP Conference Proceedings, American Institute of Physics.

Sheth, N. S. and R. B. Mistry (2011). "Formulation and evaluation of transdermal patches and to study permeation enhancement effect of eugenol." Journal of Applied Pharmaceutical Science (Issue): 96-101.

Song, W., et al. (2016). "Probing the role of chemical enhancers in facilitating drug release from patches: mechanistic insights based on FT-IR spectroscopy, molecular modeling and thermal analysis." Journal of controlled release 227: 13-22.

Wokovich, A. M., et al. (2006). "Transdermal drug delivery system (TDDS) adhesion as a critical safety, efficacy and quality attribute." European journal of pharmaceutics and biopharmaceutics 64(1): 1-8.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method for automatically assessing adhesion properties of an adhesion component of at least one transdermal delivery system (hereinafter "TDS") product using a surface energy impact assessment system, the method comprising:

temporarily affixing a skin-correlated probe comprising a polymer selected from at least one of polypropylene and polyethylene and having a measured surface energy of about 25-50 dyne/cm as determined by static contact-angle measurement using water and diiodomethane, and having a concave tip surface to a texture analyzer of the surface energy impact assessment system, the surface energy impact assessment system being communicatively coupled to a computing device having at least one processor, wherein at least one portion of the skin-correlated probe is configured to abut at least one portion of a surface of the adhesion component of the at least one TDS product;

applying, via the texture analyzer, a force while operating the texture analyzer with a pre-test speed between about 0.1 and about 1.5 mm/s, a test speed between about 0.1 and about 1.5 mm/s, a post-test speed between about 0.1 and about 2.5 mm/s, an applied force between about 0.1 and about 5 g-force, a trigger force of at least about 0.2 g-force, and a contact time of at least about 5 s to the adhesion component of the at least one TDS product, wherein the force is configured to separate the at least one portion of the skin-correlated probe from the at least one portion of the adhesion component of the at least one TDS product;

calculating, via the at least one processor of the computing device, a peak-adhesion force of the at least one TDS product, wherein the peak-adhesion force is the maximum tensile force during retraction required to separate the adhesion component from the skin-correlated probe;

comparing, via the at least one processor of the computing device, the analyzed peak-adhesion force to a stored peak-adhesion force obtained for a stainless-steel probe under the same test parameters and computing a ratio $\text{PeakF}_{skin}/\text{PeakF}_{SS}$; and automatically, displaying, in real-time, the analyzed peak adhesion force and the computed ratio, wherein when the computed ratio $\text{PeakF}_{skin}/\text{PeakF}_{SS}$ is less than or equal to predetermined threshold value, the display device transmits a notification indicating skin-correlated performance.

2. The method of claim 1, wherein the stored peak-adhesion force comprises a peak-adhesion force of a stainless steel probe.

3. The method of claim 2, further comprising the step of, recording, via the at least one processor of the computing device, the analyzed peak adhesion force in a memory of the computing device.

4. The method of claim 3, further comprising the step of, comparing, via the at least one processor of the computing device, the recorded peak adhesion force to an alternative analyzed peak adhesion force, the predetermined peak adhesion force, or both.

5. The method of claim 4, further comprising the step of, automatically displaying, via the at least one processor of the computing device, the analyzed peak adhesion force on the display device associated with the computing device, by:

based on a determination that the recorded peak adhesion force is lower than the alternative analyzed peak adhesion force, the predetermined peak adhesion force, or both, transmitting a notification indicative of recommending use of the skin-correlated probe associated with the recorded peak adhesion force; and based on a determination that the recorded peak adhesion force is higher than the alternative analyzed peak adhesion force, the predetermined peak adhesion force, or both, transmitting a notification indicative of not recommending use of the skin-correlated probe associated with the recorded peak adhesion force.

6. The method of claim 1, wherein the surface energy impact assessment system further comprises an additive manufacturing device.

7. The method of claim 6, further comprising the step of, generating, via the additive manufacturing device, the skin-correlated probe.

8. The method of claim 1, wherein the step of temporarily affixing the skin-correlated probe to the texture analyzer, further comprises the step of, heating the adhesion component for a predetermined period of time, wherein the adhesion component is affixed to a release liner.

9. The method of claim 8, wherein the adhesion component is heated to at least 90° C.

10. The method of claim 8, wherein the predetermined period of time is at least 30 minutes.

11. The method of claim 8, wherein the surface energy impact assessment system further comprises a laminator.

12. The method of claim 8, wherein the step of temporarily affixing the skin-correlated probe to the texture analyzer, further comprises the step of, laminating, via the laminator of the surface energy impact assessment system, the release liner to a backing membrane.

13. A system for automatically assessing adhesion properties of an adhesion component of at least one transdermal delivery system (hereinafter "TDS") product, the system comprising:

a skin-correlated probe, wherein the skin-correlated probe comprises a polymer selected from at least one of polypropylene and polyethylene, has a measured surface energy of about 25-50 dyne/cm as determined by static contact-angle measurement, and has a concave tip surface;

a texture analyzer, the texture analyzer being configured to selectively couple to the skin-correlated probe;

a computing device comprising at least one processor, the computing device being communicatively coupled to the texture analyzer, the computing device being configured to compute a maximum tensile force during retraction as a peak adhesion force and to compute a ratio of that peak adhesion force to a stored peak adhesion force obtained for a stainless-steel probe under the same test parameters;

wherein when selectively coupled to the texture analyzer, at least one portion of the skin-correlated probe is configured to abut at least one portion of the adhesion component of the at least one TDS product; and wherein the texture analyzer is configured to impart a force onto the skin-correlated probe, the adhesion component, or both, whereby the at least one portion of the skin-correlated probe is separated from the at least one portion of the adhesion component of the at least one TDS product.

14. The system of claim 13, further comprising an additive manufacturing device.

15. The system of claim 14, wherein the additive manufacturing device is configured to generate the skin-correlated probe, and the skin-correlated probe comprises polypropylene.

16. The system of claim 13, wherein the adhesion component comprises a silicone amine compatible coating, a silicone non-amine compatible coating, or both.

17. The system of claim 13, wherein the texture analyzer further comprises a skin-correlated probe sander.

18. The system of claim 17, wherein the texture analyzer is configured to postprocess the at least one portion of the skin-correlated probe configured to contact the at least one portion of the adhesion component, via the skin-correlated probe sander, whereby the at least one portion of the skin-correlated probe comprises an identical surface with no deformations.

19. The system of claim 13, wherein the peak adhesion force measured with the skin-correlated probe is at most 2 g.

* * * * *